INVENTORS
H. H. ARNOLD
J. H. BOATWRIGHT
J. D. SCHILLER
BY
R. P. Miller
ATTORNEY

INVENTORS
H. H. ARNOLD
J. H. BOATWRIGHT
J. D. SCHILLER

BY

ATTORNEY

INVENTORS
H. H. ARNOLD
J. H. BOATWRIGHT
J. D. SCHILLER
BY R. P. Miller
ATTORNEY

INVENTORS
H. H. ARNOLD
J. H. BOATWRIGHT
J. D. SCHILLER
BY
ATTORNEY

INVENTORS
H. H. ARNOLD
J. H. BOATWRIGHT
J. D. SCHILLER
BY
R. P. Miller
ATTORNEY

INVENTORS
H. H. ARNOLD
J. H. BOATWRIGHT
J. D. SCHILLER
BY
R. P. Miller
ATTORNEY

INVENTORS
H. H. ARNOLD
J. H. BOATWRIGHT
J. D. SCHILLER

BY R. P. Miller

ATTORNEY

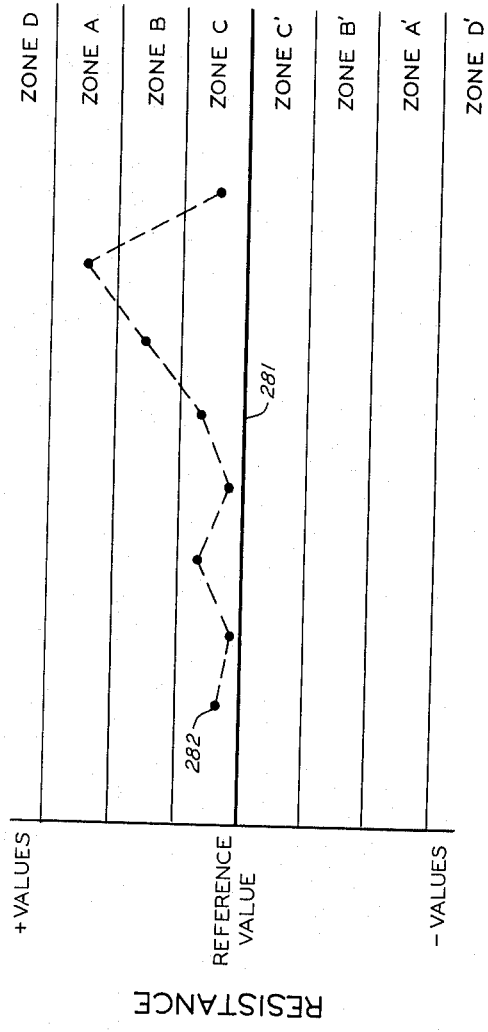

United States Patent Office 3,222,504
Patented Dec. 7, 1965

3,222,504
MONITORING SYSTEM FOR CONTROLLING A COMPONENT FABRICATING MACHINE
Howard H. Arnold, James H. Boatwright, and Jacob D. Schiller, all of Winston-Salem, N.C., assignors to Western Electric Company, Incorporated, New York, N.Y., a corporation of New York
Filed June 23, 1961, Ser. No. 119,217
17 Claims. (Cl. 235—151.13)

This invention relates to a monitoring system for controlling a component fabricating machine, and more particularly to an apparatus for continuously monitoring and adjusting a machine for fabricating resistors in accordance with trends of variations in the resistance values of fabricated resistors.

Resistors of the carbon deposit type suffer characteristically from failure in service due to certain small variations in the physical properties of the core and coated resistance material which make up the resistor. The resistors fail in service due to handling of the uncompleted product by production workers, due to patent defects introduced during the manufacturing stages, due to human errors in the setup of the controls of the machinery which control the resistance magnitude of the resistor, and due to failures which occur as a result of physical handling of the resistors prior to encapsulation of the resistors in a package such as a polyethylene cover.

It is, therefore, an object of the present invention to provide for a new and improved monitoring system for controlling a component fabricating machine.

It is an object of this invention to provide a device for automatically monitoring the manufacture of electrical components wherein a continuous measurement is made of the manufactured component during various manufacturing stages in order to avoid failure variations which may be introduced to the component.

Another object of this invention is to provide an apparatus for automatically monitoring the resistance value of fabricated resistors so that the values of the resistances can be recorded and segregated according to a relative deviation from a predetermined value.

It is still a further object of this invention to provide a system for automatically monitoring the magnitude of a physical characteristic of a fabricated component to detect variation trends which tend to develop during the fabrication of the component and to make corrections at the fabricating stations to correct for developed variation trends.

Another object of the instant invention is to provide a system for monitoring error trends which develop in the characteristics of a predetermined lot of components so that corrections may be made in the manufacturing machinery to overcome the error trend.

A still further object of the instant invention is to provide an automatic system for continuously monitoring the error in the cumulative resistance value of a predetermined lot of resistors to continuously determine error trends which develop in the cumulative resistance values of a predetermined number of lots so that instantaneous corrections can be made in an automatic helixing apparatus, fabricating the resistor, to bring the resistance value of the fabricated resistors back to a predetermined value.

With these and other objects in mind, a preferred embodiment of the present invention contemplates the use of a helixing machine in combination with an electrical bridge for controlling the length of a helical groove, indicative of resistance value, on a deposited carbon resistor. The resistor is transported from a helixing station to a test station where the resistance value is measured by another bridge. The resistance value of the resistor is transposed from an analog form to a binary form by circuitry associated with the measuring bridge and the binary value of the resistance is recorded and stored. After a predetermined number of resistors are measured and the cumulative value of the resistance is recorded by a serial adder circuit, the cumulative value is used by an analysis circuit to determine whether the helixing machine is producing resistors which are tending to vary from a predetermined limit. An error signal from the analysis circuit results when an undesirable error trend develops in the manufacture of the resistor at the helixing station. An error signal triggers adder circuits which utilize the cumulatively added resistance magnitude of a predetermined number of resistors to make a change in the value of the reference resistance in an arm of a control bridge associated with the helixing machine. An output from the bridge is utilized to adjust instrumentalities in the helixing machine to bring the value of the deposited carbon resistors produced at the helixing station back to a predetermined value or within the predetermined limits. However, the correction which is made is not necessarily of the magnitude required to correct for the full deviation of the measured resistance from a predetermined value, but rather to overcome the trend.

Other objects and advantages of the invention will become apparent by reference to the following detailed description and the accompanying drawings illustrating a preferred embodiment thereof, in which.

Figure 1:
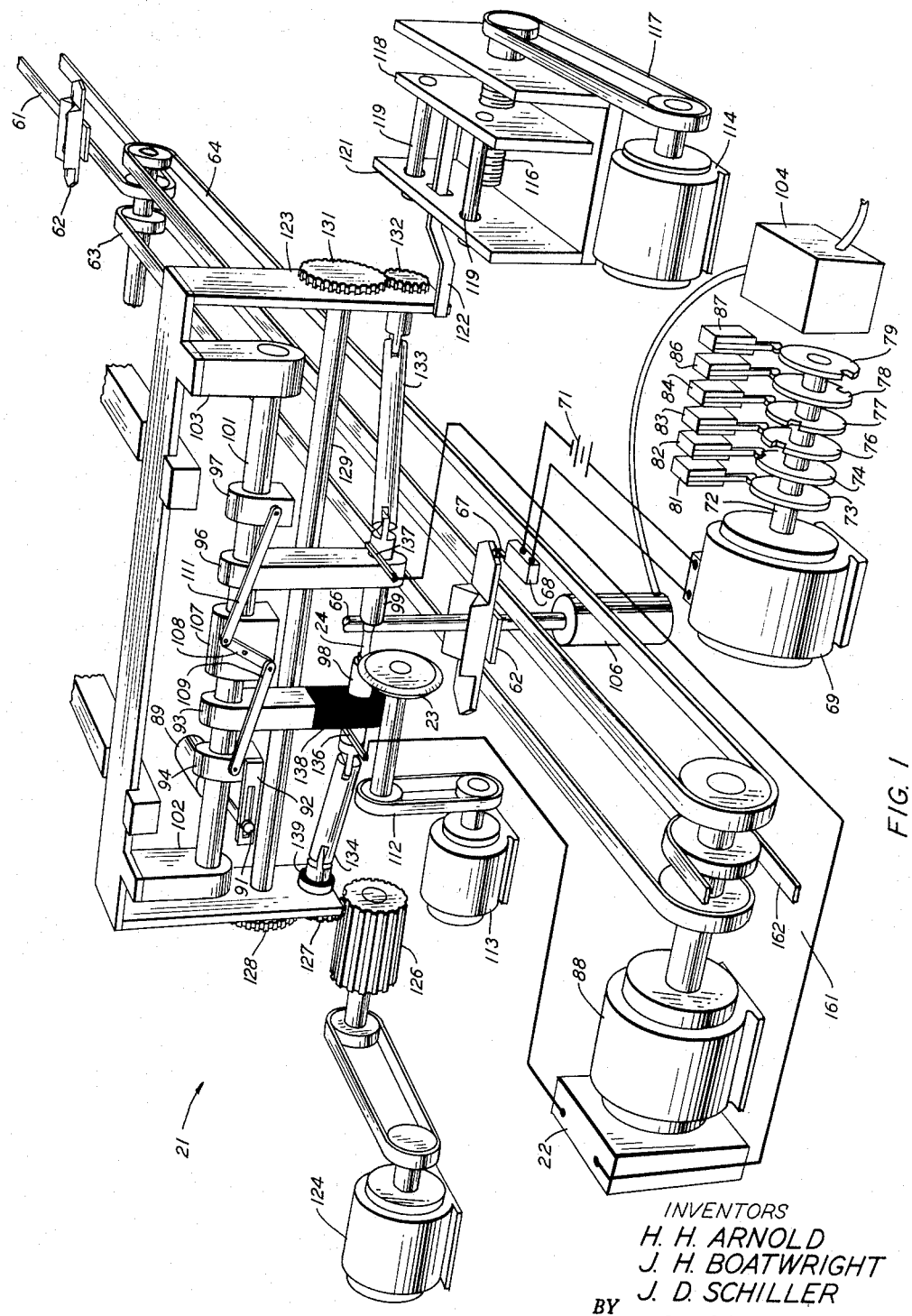
FIG. 1 is a perspective view of a helixing machine for cutting a helical groove in a carbon film coated on a resistor core.
Figure 2:
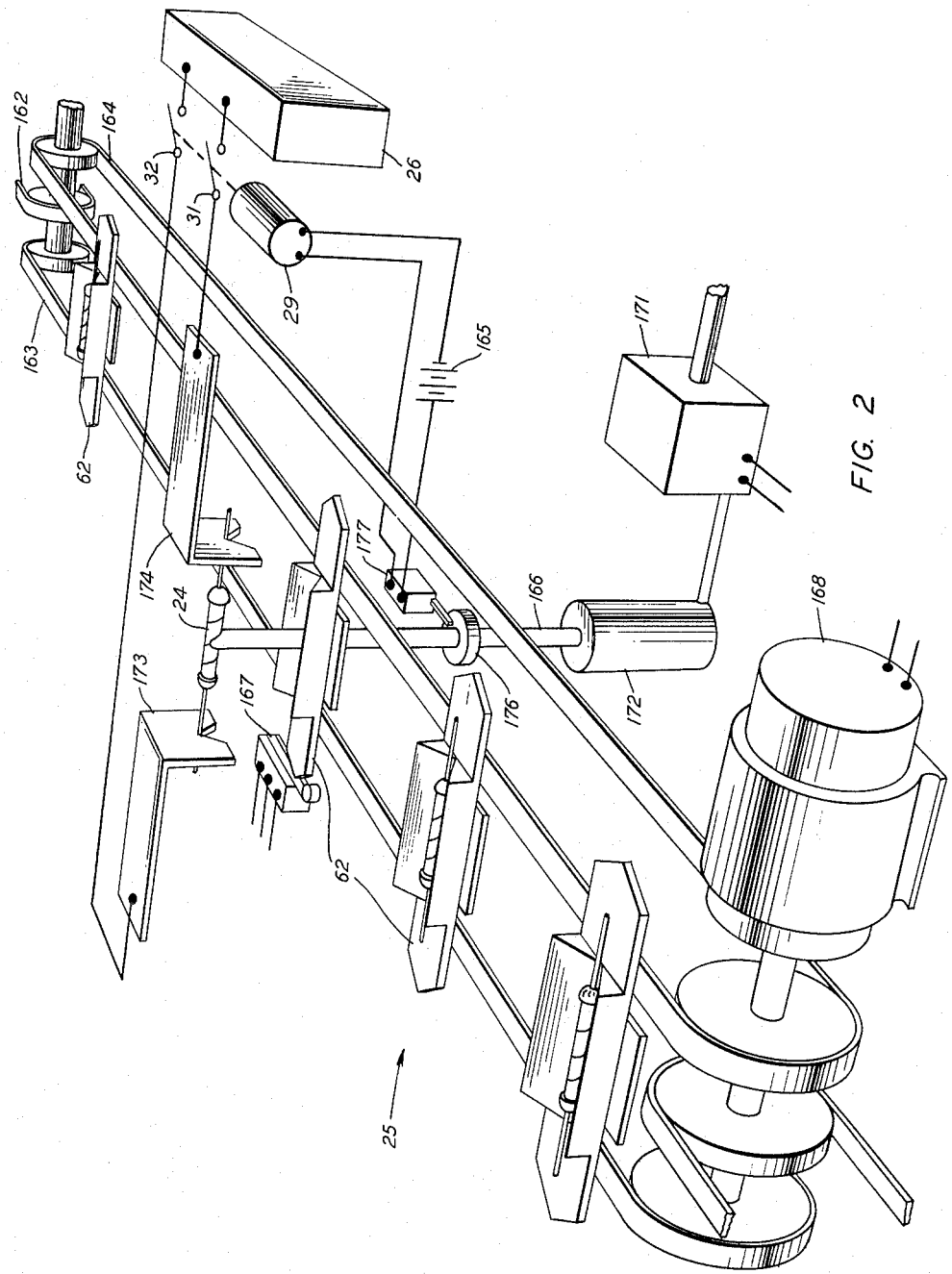
FIG. 2 is a perspective view of a resistance measuring station.
Figure 3:
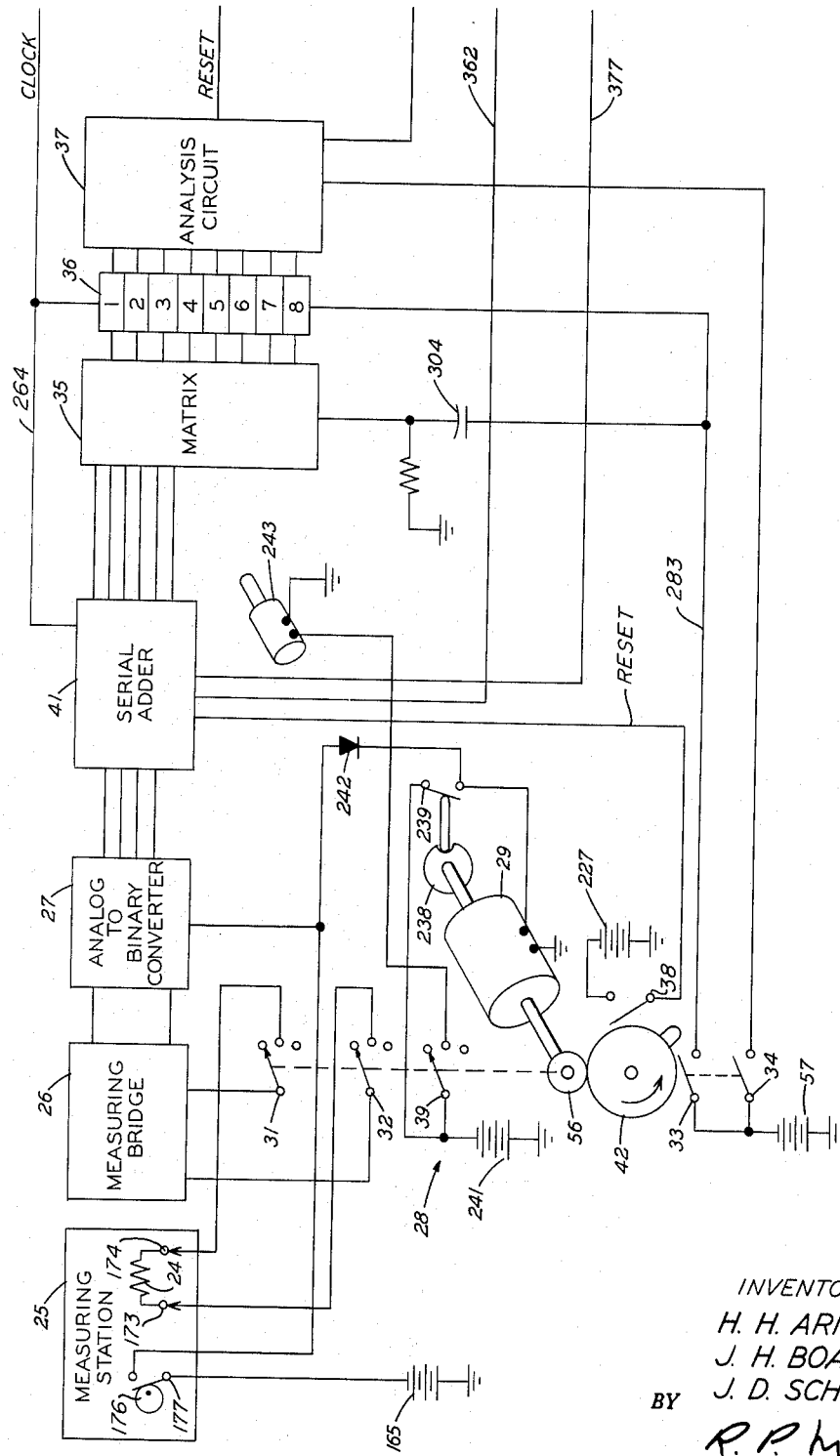
Figure 4:
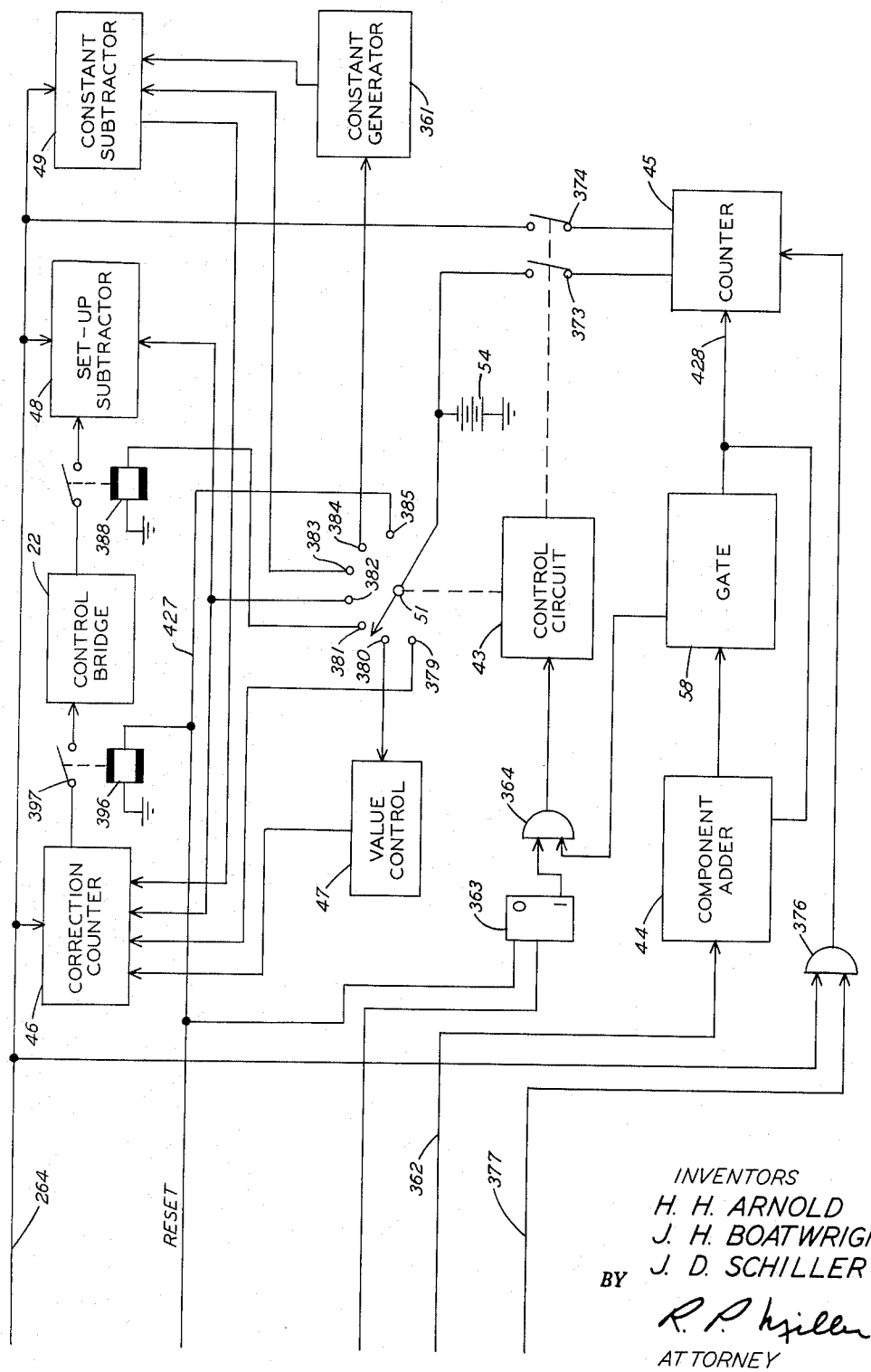

FIGS. 3 and 4 when assembled in the manner depicted in FIG. 15 shows a system which is connected to a helixing machine and measuring station of FIGS. 1 and 2, respectively.

FIGS. 5, 6, 7, 8, 9, 10, 11, 12, and 13 when assembled in the manner depicted in FIG. 16 is a detailed circuit diagram of the monitoring system shown in block diagram form in FIGS. 3 and 4;

FIG. 14 is a graph of plotted points representing cumulative magnitudes of resistance measured by the measuring station of FIG. 2;

FIG. 15 is a layout diagram to show the relationship of FIGS. 3 and 4; and

FIG. 16 is a layout diagram to show the relationship of FIGS. 5, 6, 7, 8, 9, 10, 11, 12, and 13.

Referring to FIGS. 3 and 4 there is shown a block diagram of the entire system. At a helix machine 21, see FIG. 1, a helix is cut in a resistor 24 coated with a film of carbon. The length of the helical cut is electrically determined by a helix control bridge 22 which sends a signal to the helixing machinery and stops the operations of a helixing cutter 23, see FIG. 1, when control bridge 22 is balanced by the resistance of the carbon path cut on the carbon coated core.

A completed resistor, such as resistor 24, is then electrically measured at measuring station 25 by measuring bridge 26 to determine the resistance value of the resistor. A signal output from bridge 26 representing the magnitude of the resistance is fed to analog-to-binary converter 27 where the represented resistance value is changed to a binary signal which is used to operate storage and logic circuits. A timer system generally designated by 28 is used to selectively close switches which initiate the operation of the various circuits of the system. Timer motor 29 operates switches 31 and 32 to connect measuring bridge 26 to measuring station 25. Timer 28 also selectively closes switches 33 and 34 which operate matrix 35, storage registers 36, and analysis circuit 37. After a predetermined group of resistors, such as five, is tested, these circuits are operated to register the cumulative resistance value of the group and to produce an output signal in the event that the registration of this cumulative resistance value denotes an error trend which may be developing in the resistance value of the resistors being produced at the helixing machine 21. Additionally, timer 28 selectively closes switches 38 and 39 to operate serial adder 41. After a resistor 24 is measured, the resistance value is changed to a binary value by analog-to-binary converter 27. Operation of serial adder 41 is initiated when switches 38 and 39 are closed by cam 42 and rotating pinion 56 respectively operated by timer motor 29 of timer 28, and by the binary output from analog-to-binary converter 27. Counter circuits of serial adder 41 record the binary value of each resistor 24, but no output results from serial adder 41 until a resistance value of a group of five resistors is recorded by the counter circuits of serial adder 41. After five recordings are made, cam 42 operated by the pinion 56 which rotates five times to one rotation of cam 42, closes switch 33 to place a signal from battery 57 on matrix 35 and registers 36. An output from serial adder 41, which represents the cumulative resistance value of a group of five resistors, opens a terminal of matrix 35 to pass the signal from battery 57 to one of eight magnetic memory drums of storage register 36. The particular memory drum selected by matrix 35 depends on the magnitude of the output from serial adder 41. Switch 34 is also closed by cam 42 to place a potential from battery 57 on analysis circuit 37, so that in the event that the output from serial adder 41 is a value which establises a trend of resistance values which deviate from a predetermined value, analysis circuit 37 produces an error signal output.

The error signal enables control circuit 43 to facilitate initiation of a control bridge correction cycle. Component adder 44 is connected to the serial adder 41 to continuously count the number of resistors 24 being measured in order to establish the predetermined number of resistors 24 which must be measured before a correction is made on the control bridge 22. After the predetermined number of resistors is measured at measuring station 25, a signal from component adder 44 triggers control circuit 43 through gate 58 to initiate a control bridge correction cycle.

The magnitude of the correction made on bridge 22 is determined by the cumulative count of resistance value counted by counter 45 and by the control bridge set-up preceding the correction cycle. Counter 45 cumulatively adds the resistance value of a predetermined number of resistors, such as five, measured by bridge 26.

The cumulative value counted by counter 45 is subtracted, under the control of control circuit 43, from a predetermined ideal value of resistance plus a constant which is impressed on correction counter 46 by value control 47. The resistance value previously set on control bridge 22 is then impressed on set-up subtractor 48 after which the previous set-up value from control bridge 22 is added to the count on correction counter 46 under the control of set-up subtractor 48.

Next constant subtractor 49 is connected to correction counter 46 by way of switch 51. The constant value impressed on correction counter 46 with the ideal resistance value is subtracted from counter 46 under the control of subtractor 49. The value remaining on correction counter 46 is the new control bridge set-up required to bring the resistance value of resistors 24 more in line with the value of the ideal resistance value. The new value on counter 46 is impressed on contacts associated with control bridge 22 under the control circuit 43. At the completion of the correction cycle, a reset signal from battery 54 resets analysis circuit 37, component adder 44 again begins to count a new series of resistors, counter 45 starts a new cumulative count of resistance values, and the analysis circuit 37 again checks for error trends which may be established by a count of the cumulative resistance value of groups of a predetermined number of resistors 24.

Next, reference should be made to the mechanical aspects of the instant apparatus in FIG. 1 of the drawings, which generally discloses a helixing station for cutting a helical groove in the carbon coating of resistor 24 in order to establish the magnitude of the electrical resistance of the resistor. Belt 61 conveys a pallet 62, carrying a carbon coated resistor core, from a preceding capping station, which is not shown in the drawings. At the preceding capping station, a resistor core with the carbon deposit is terminated with a pair of electrical leads containing a cap which covers either end of the core and the entire assembly is placed on pallet 62 for transfer along conveyor belt 61. The pallet and terminated resistor core are transferred from belt 61 to belts 63 and 64 of the helixing station in the normal operation of the station. However, in the event that the helixing station 21 is inoperative for a short period of time, conveyor belts 63 and 64 will not operate and, consequently, pallet 62 is not transferred from belt 61 to conveyor belts 63 and 64. Pallets which subsequently arrive at the junction of belt 61 and conveyor belts 63 and 64 line up behind the first untransferred pallet. Thus it is apparent that belt 61 acts as a storage area for the output of the capping station in the event the helixing station is momentarily inoperative, and conveyor belts 63 and 64 are inoperative. This storage feature of belt 61 permits momentary breakdowns at helixing station 21 without interruption of the capping operation.

In the normal operation, pallet 62 advances along conveyor belts 63 and 64 to a position immediately above pushrod 66. As pallet 62 arrives at the operation position of the helixing station, an arm 67 of switch 68 is closed when contacted by pallet 62. Motor 69 is energized by a power source 71 when switch 68 is closed. Shaft 72, rotated by motor 69, contains a plurality of cams 73, 74, 76, 77, 78 and 79 for sequentially operating a plurality of associated switches, 81, 82, 83, 84, 86 and 87 respectively.

The electrical circuit of motor 88 is opened when cam 73, rotated by motor 69 and shaft 72, strikes and opens switch 81, thus stopping conveyor belts 63 and 64 during the time when cutter 23 is cutting a helical groove in the carbon coated resistor core. Switch 82 is then operated by cam 74 to close an electrical circuit (not shown) to energize solenoid 89. Energized solenoid 89 draws rod 91 into the body of the solenoid to rotate slotted arm 92, carriers 93 and 96, blocks 94 and 97, and chucks 98 and 99 counterclockwise as viewed from the right end of the machine in FIG. 1, to bring chucks 98 and 99 vertically above pushrod 66.

It should be noted that carriers 93 and 96 and blocks 94 and 97 are fixedly mounted on shaft 101 so that as slotted arm 92 rotates these members, the shaft 101 also rotates. However, carriers 93 and 96 and blocks 94 and 97 are also mounted so that they can be moved axially along shaft 101 to force chucks 98 and 99 together to engage resistor 24 and secure it between chucks 98 and 99. Since the means of mounting the carriers and blocks are not essential to the novelty of the system, the mountings are not shown in detail. Shaft 101 is mounted on bearing blocks 102 and 103 for rotation. After chucks 98 and 99 have been rotatably positioned vertically above and axially parallel with resistor 24, continued rotation of shaft 72 forces cam 76 to close switch 83 which operates an electrical circuit which operates air valve 104 to direct air to enter cylinder 106. The piston of cylinder 106 forces pushrod 66 upwardly through an aperture in pallet 62 and engages resistor 24 to carry it into axial alignment with chucks 98 and 99. Next, rotary solenoid 107 is energized when shaft 72 rotates cam 77 into contact with and closes switch 84. Rotary solenoid 107 rotates arm 108 in the counterclockwise direction to draw chucks 98 and 99 together to secure resistor 24 therebetween.

The rotary solenoid operates to close chucks 98 and 99 through linkages 109 and 111, which in turn act on blocks 94 and 97 linked to carriers 93 and 96. Arm 92 is slotted so that arm 92 may be moved axially along its length during this operation without affecting solenoid 89. Solenoid 89 is then deenergized as switch 82 is disengaged by cam 74 with continued rotation of shaft 72, thus permitting carriers 93 and 96 and blocks 94 and 97 to swing from a position above pallet 62 to a downward position under the influence of gravity.

When the carriers swing into the downward position, resistor 24 contacts cutting wheel 23, which is driven at a high rate of speed through belt 112 by motor 113. Simultaneously with the positioning of the carriers 93 and 96, motor 114 is started when cam switch 86 is closed by cam 78. Motor 114 drives lead screw 116 through a belt and pulley arrangement 117. Lead screw 116 engages a traverse block 118 with associated guide rod 119, which slide through apertures in stationary frame 121. Rod 122 is connected to traverse block 118 and is also connected to carriage 123. As motor 114 rotates lead screw 116, traverse block 118 moves to the left, as disclosed in FIG. 1, carrying rod 122 and carriage 123 to the left, as disclosed in FIG. 1. Bearing blocks 102 and 103, carriers 93 and 96, blocks 94 and 97, and likewise chucks 98 and 99 with secured resistor 24, move left along the length of the resistor, as shown in FIG. 1, thus providing for the axial movement necessary for the cutting of a helical groove along the surface of resistor 24.

As carriers 93 and 96 and blocks 94 and 97 swing into the downward position, and as motor 114 begins to operate lead screw 116, motor 124 is also energized through cam switch 86. Motor 124 drives spline gear 126 which engages spur gear 127 to drive gear 128 to transmit power along shaft 129 to spur gear 131. Spur gear 131 engages spur gear 132 to rotate shaft 133. Spur gear 127 operated by spline gear 126 also rotates shaft 134. Shafts 133 and 134 rotate chucks 98 and 99 so that the resistor 24 is rotated about its axis. Thus it can be seen that as the resistor 24 is being rotated about its axis, movement of carriage 123 carries the resistor 24 in the axial direction and rotating cutter 23 cuts a helical groove through the carbon film of the resistor 24 to increase the length of the resistance path on the resistor 24. Brushes 136 and 137 connect through chucks 98 and 99 to the electrical terminals of resistor 24. As the helical groove is cut in the resistor, the increasing resistance of the resistor 24 is monitored on a control bridge 22. Insulating block 138 and insulating collar 139 prevent short circuiting of the resistor through the frame of the helixing machine during this measuring and cutting operation. (Bridge 22 is shown in detail in FIG. 12.) This bridge is a conventional Wheatstone bridge in which zero output appears across terminals 141 and 142 when the ratio of arm 143 to arm 144 is equal to the ratio of arm 146 to arm 147. The resistance in arm 146 is set to a desired value by the action of relays 148, 149, 151, 152, 153, and 154. These relays are in turn controlled by analysis and correction circuits which make corrections on bridge 22 when the tested resistors 24 show tendencies to deviate from a predetermined value. Similarly, arm 143 is set to a desired resistance value by changing variable resistor 156.

As the resistor 24 is helixed, the current output from terminals 141 and 142 of the bridge to resistor 24 reduces in value as the resistance of resistor 24 approaches the desired value. When the precise value of resistance necessary to balance bridge 22 is attained, zero output is produced from amplifier 157. The zero output from amplifier 157 deenergizes relay 158. A normally opened contact 159 closes when relay 158 is deenergized and connects solenoid 89 (see FIG. 12) to battery to again energize solenoid 89. Rod 91 of solenoid 89 rotates carriers 93 and 96, and blocks 94 and 97 with associated chucks 98 and 99 away from the cutting wheel 23, thus terminating the helical cut. After the conclusion of the cut, an unload cycle is initiated which results in the following sequence of operations.

First, cam switch 86 disengages cam 78 to deenergize motors 113 and 114. Cam 79 engages cam switch 87, which is a reversing switch, to energize drive motor 114 to move the carriage 123, including chucks 98 and 99, to the right to position the carriage for another cycle of automatic operation. Cam switch 84 disengages cam 77 (see FIG. 1) which opens the circuit (not shown), of rotary solenoid 107, to deenergize solenoid 107 so that it rotates in the clockwise direction as viewed in FIG. 1. Rotation of shaft 108 of rotary solenoid 107 forces carrier 93 and block 94 apart from carrier 96 and block 97 to carry chucks 98 and 99 away from the ends of resistor 24. Cam switch 83 disengages cam 76 to operate the circuit (not shown) which operates air valve 104, thus reversing air pressure to air cylinder 106. Pushrod 66, carrying resistor 24, moves vertically downward when the air pressure in cylinder 106 reverses. The pushrod 66 retracts through the aperture in pallet 62 and deposits the resistor 24 on pallet 62. Switch 81 disengages cam 74 to close the circuit to conveyor motor 88, which in turn initiates movement of conveyor belts 63 and 64 to transport pallet 62 from the work position to a transfer point, generally designated as position 161. As pallet 62 moves out of the work position, the power circuit of motor 69 is opened as pallet 62 disengages switch 68 and permits it to open.

Pallet 62 advances from conveyor belts 63 and 64 to belt 162, which is similar and has the same storage function as belt 61, previously described. The pallet 62 and resistor 24 are then transferred from belt 162 to measuring station conveyor system belts 163 and 164. Belts 163 and 164 carry pallet 62 and resistor 24 to the measuring station work position directly above pushrod 166. Pallet 62 advances to the work position and strikes switch 167, which opens the power circuit of motor 168 which operates the conveyor belts 163 and 164, see FIG. 5, thus stopping the belts. Operation of switch 167 by pallet 62 applies power from battery 165 to solenoid 169 (FIG. 5) to operate a valve (not shown) of an air supply 171, which passes air into air cylinder 172 to move a piston (not shown) and pushrod 166 vertically upward. Pushrod 166 advances through an aperture in pallet 62 and carries resistor 24 upwardly until the terminals of the resistor engage spring contacts 173 and 174 to complete an electrical circuit through measuring bridge 26. At the same time that pushrod 166 is forcing resistor 24 against terminals 173 and 174, a collar 176, attached to pushrod 166, strikes and closes switch 177, which initiates a measuring cycle by connecting motor 29 (see FIG. 5) across the battery 165.

Figure 5:
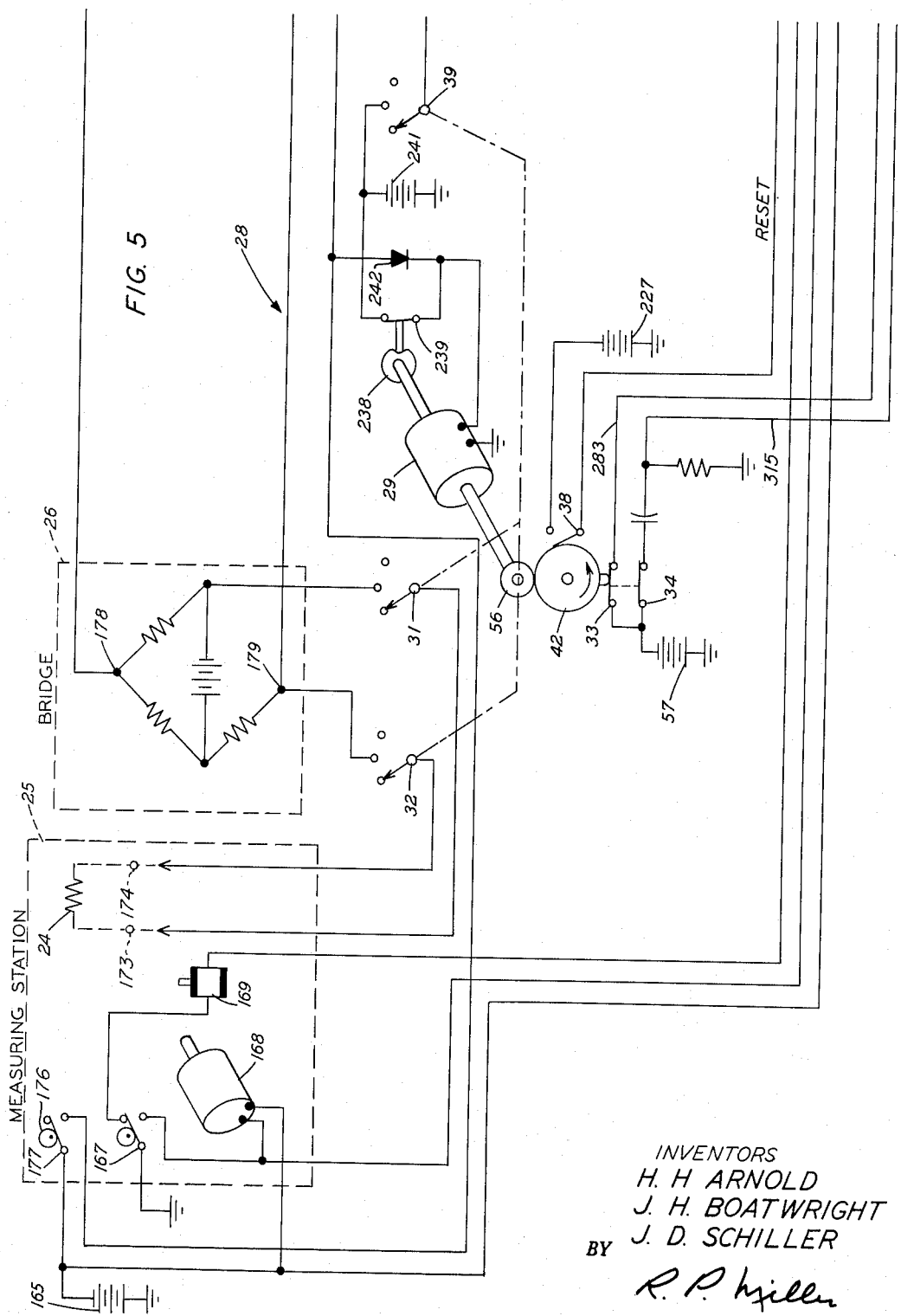

Measuring bridge 26, disclosed in FIG. 5, operates in a similar fashion to the control bridge 22 disclosed in connection with the helixing station. The voltage output from terminals 178 and 179 of this bridge is connected to an analog-to-digital converter 27, shown in FIG. 6. The analog-to-digital converter 27 is designed to change the resistance value of resistor 24 measured on bridge 26 into digital or binary signals which are subsequently used to analyze and readjust the resistance values in the arm 146 of helixing control bridge 22 if the value of the resistance of resistor 24 varies from a predetermined value as set on measuring bridge 26.

Figure 6:
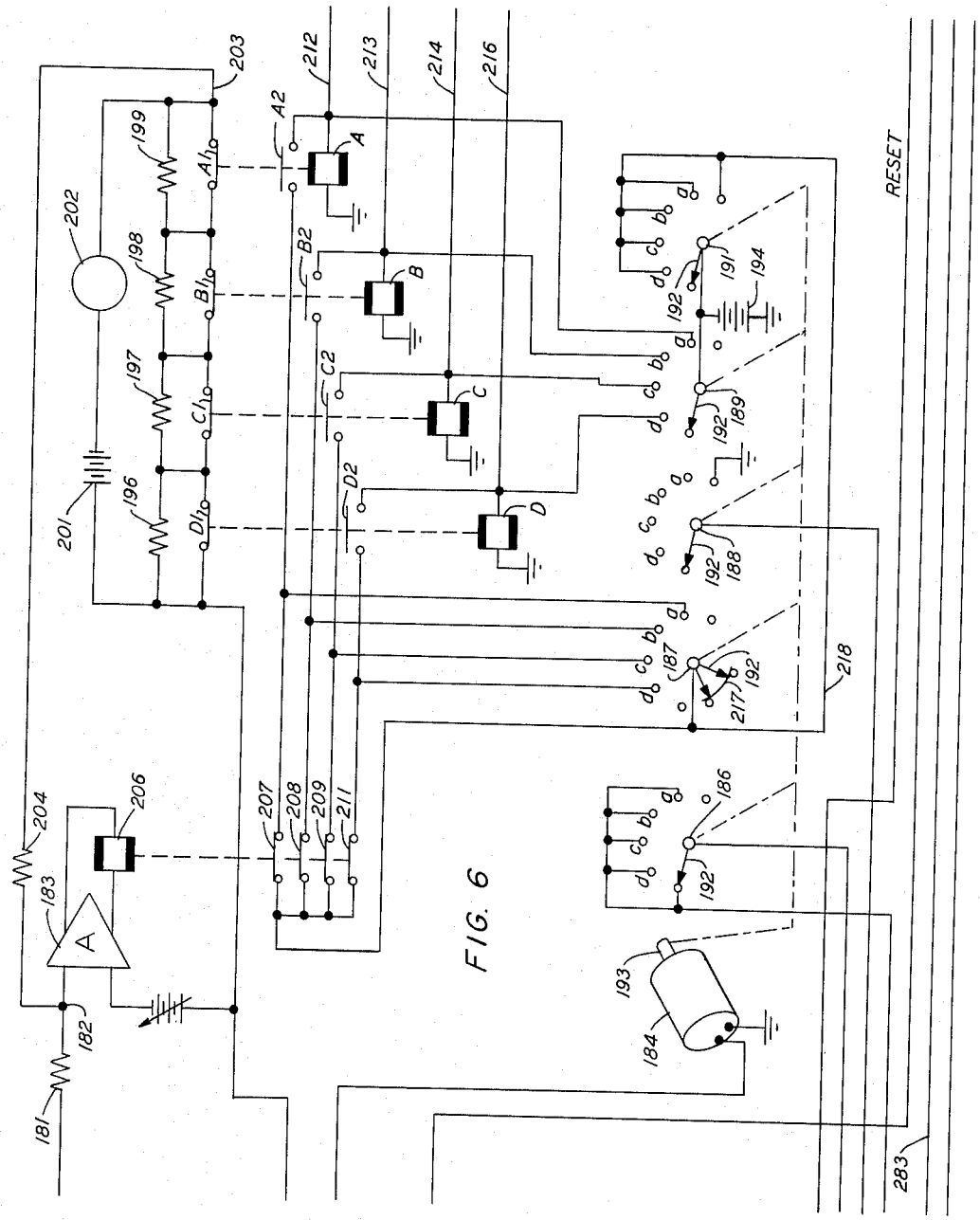

Referring to FIG. 6 for a general description of the analog-to-binary converter 27, the output from the measuring bridge 26 is connected across terminals 178 and 179 (see FIG. 5) through a resistor 181 to an input terminal 182 of an amplifier 183. When switch 177 is closed by collar 176 (see FIG. 2) see FIG. 6 motor 184 is also connected to battery 165 (see FIG. 5). Motor 184 simultaneously rotates the wipers 192 of switches 186, 187, 188, 189 and 191. Each wiper 192 has corresponding terminals a, b, c, and d so that when motor 184 moves a common shaft 193, wipers 192 each move from, for example, terminal d to terminal c. When wiper 192 of switch 189 contacts terminal d, a battery 194 is connected to relay D, which is thereby energized. Relay D opens normally closed contact D–1 to place resistor 196 across battery 201 and across constant current regulator 202 so that a voltage is produced at point 203 which is proportional to the magnitude of resistance 196. The voltage developed across resistor 196 is connected to point 182 through resistor 204 of known resistance value so that it opposes the voltage developed across bridge 26 and connected to point 182 through resistor 181 which is precisely equal to resistor 204. Amplifier 183, which is connected to relay 206, is adjusted so that no output from amplifier 183 to relay 206 results if a resultant negative voltage from bridge 26 occurs at terminal 182. If, however, the voltage drop developed across resistor 196 is more positive than that from the input terminals 178 and 179 of bridge 26, relay 206 is operated since the input voltage to amplifier 183 is more positive. When the input to amplifier 183 is more positive, the output from amplifier 183 energizes relay 206 so that relay 206 simultaneously opens all of the normally closed contacts 207, 208, 209, and 211.

Normally closed contacts 207, 208, 209, and 211 are in the holding circuits of relays A, B, C, and D. Relays A, B, C, and D are selectively energized and are held operated though holding relay contacts 207, 208, 209, and 211, respectively, so that a potential from battery 194 is selectively placed on lines 212, 213, 214, and 216, respectively, to produce a digital representation of the resistance value of resistor 24. This representation can be accomplished since, when the voltage developed across test resistor 24 is equal to the opposed voltage developed across some combination of resistors 196, 197, 198, and 199, amplifier 183 ceases to energize relay 206 and relay 206 will not open the holding circuits of the selected relays A, B, C, or D.

Assume that a resistor 24 is being tested on bridge 26, and assume that the resistance is slightly larger than 12 ohms, the voltage developed across bridge 26 is placed on analog-to-binary converter 27 through resistor 181. Motor 184 rotates the wipers 192 of switches 186, 187, 188, 189, and 191 from the start position to terminals d respectively of each switch. Wiper 192 of switch 189 connects relay D to battery 194. Relay D opens contact $D_1$ to place resistor 196 across battery 201 and across constant current source 202 and to close contact $D_2$ to connect relay D to battery 194 through normally closed holding relay contact 211 and switch 191. The voltage developed across resistor 196 is placed on amplifier 183 in opposed polarity to the voltage from bridge 26. If the values of resistors 196, 197, 198, and 199 are 8 ohms, 4 ohms, 2 ohms, and 1 ohm, respectively, the magnitude of resistor 196 is too small to develop a voltage to overcome the negative voltage from bridge 26 so that amplifier 183 will remain inoperative. Deenergized relay 206 will not operate normally closed contact 207 so that as motor 184 rotates wipers 192 of switches 186, 187, 188, 189, and 191 from terminal d to terminal c, relay D will remain connected to battery 194 by the holding circuit through contact $D_2$, normally closed contact 211, and switch 191. Energized relay D holds contact $D_2$ closed and holds contact $D_1$ open to keep resistor 196 across battery 201. Next motor 184 rotates wiper 192 of switch 189 to terminal c to connect relay C to battery 194. Relay C opens contact $C_1$ to place resistor 197 across battery 201. Since the sum of resistors 196 and 197 still develop a voltage at point 182, slightly less than the voltage from bridge 26, relay 206 does not open holding relay contact 209. Relay C thus remains energized as did relay D. Note that all the wipers 192 simultaneously rotate to the respective terminals c.

Next motor 184 rotates wiper 192 of switch 189 to terminal b to connect relay B to battery 194. Energized relay B opens contact $B_1$ to place the 2 ohm resistor 198 in series with the 4 ohm resistor 197 and the 8 ohm resistor 196. Now the voltage developed across resistors 196, 197, and 198 is great enough to overcome the voltage across bridge 26. When this occurs, amplifier 183 is energized to operate relay 206. Energized relay 206 simultaneously opens contacts 207, 208, 209, and 211. Since contact 208 associated with the holding circuit of relay B is opened, relay B is deenergized when wiper 192 of switch 189 moves from terminal b to terminal a. Since relay B is not energized, resistor 198 is shunted out of the circuit by normally closed contact $B_1$, and contact $B_2$ in the holding circuit is opened. Relays C and D must remain energized, and are held energized by shoe 217 of switch 187 at any time that contacts 207, 208, 209, and 211 are opened as a result of energization of relay 206. During the times when contacts 207 and 208 are open, relays C and D remain connected to battery 194 through contacts $C_2$ and $D_2$, respectively, through shoe 217, line 218, and switch 191. Shoe 217 is designed to move with sweep arm 192 of switch 187 to progressively connect the terminals of switch 187 to battery 194 to provide a holding path to battery 194 for all energized relays A, B, C, or D by way of line 218 and switch 191. The relays C and D in this case remain energized through shoe 217.

Motor 184 next moves wiper 192 of switch 189 to terminal a and the previously described procedure with respect to relays C, D, and B repeats itself for relay A. Relay A is not energized for the same reason that relay B was not energized. At this point it can be observed that the resistors 196 and 197, which remain connected across battery 201, have a value of 12 ohms, or develop nearly enough voltage drop to balance the voltage drop across bridge 26 as a result of the value of resistor 24. Relays A and B are not energized and thus represent a zero conductive state or 0 digits, whereas energized relays C and D are energized and represent mark or 1 digits in the binary system of counting. The binary representation of a resistor 24 having a value of 12 ohms is thus expressed by the series of a mark, mark, zero, and zero, or 1, 1, 0, 0, which is represented in the electrical circuitry of analog-to-binary converter by a signal on lines 214 and 216, and the absence of a signal on lines 212 and 213.

At the conclusion of the full rotation of the wipers 192 by motor 184, the selectively energized relays A, B, C, and D, representing the binary sum corresponding to a close approximation of the test resistor 24, remain operated. The output from lines 212, 213, 214, and 216 represent the outputs which correspond to the same binary sum. Any number of relays A, B, C, or D may be employed to give any range of resolution of a resistor value.

At the conclusion of the measurement, switch 186 opens the circuit to ground through switch 167 which connects air solenoid 169 to battery 165 (FIG. 5). Switch 188 closes a circuit to connect the conveyor motor 168 to battery 165 in FIG. 5. Opening of the circuit to solenoid 169 results in reversal of the air supply 171 to cylinder 172, thus forcing pushrod 166 downwardly, carrying resistor 24 out of contact with spring terminals 173 and 174, and depositing the resistor on pallet 62. Downward movement of pushrod 166 carries collar 176 out of engagement with switch 177 to open the circuit to motor 184. Motor 184 then coasts to a stop while rotating wipers 192 of switches 186, 187, 188, 189, and 191 back to the start positions of the respective switches. Thus a complete measuring cycle has been completed on one resistor 24, and the resistance value of that resistor has been changed from the analog value of approximately 12 ohms to a binary value which can now be used by other circuits, to determine whether a correction must be made on relays 148, 149, 151, 152, 153, and 154 of bridge circuit 22 (FIG. 12) to change the value length of the resistance paths being cut in resistors at the helixing station 21.

After the analog-to-binary converter 27 (FIG. 6) has converted the electrical resistance magnitude of resistor 24 to represent the binary equivalent of the resistance value, the signals from relays A, B, C, and D are connected to downcounter 219 of serial adder 41 (FIGS. 7 and 8) by way of contacts 221, 222, 223, and 224, respectively. Contacts 221, 222, 223, and 224 are operated by relay 226.

When a resistor 24, the first of a series of five such resistors, is placed across chucks 98 and 99 of the measuring station, and when switch 177 is momentarily closed, motor 29 is energized and starts rotation of cam 42 to close switch 38 (FIGS. 3 and 5). Closed switch 38 places a reset signal from battery 27 on flip-flops 228, 229, 231, 232, 233, 234, and 236 of cumulative counter 237 (see FIG. 8) to set the flip-flops to the zero conductive states.

Motor 29 also rotates cam 238 to close switch 239. Switch 239 connects motor 29 to battery 241 to insure a power supply for motor 29 so that the motor will rotate switches 31, 32, and 39 through one complete revolution each time a resistor 24 is placed across the measuring terminals at measuring station 25. Diode 242 is utilized to prevent motor 184 from being locked to battery 241.

Figure 7:
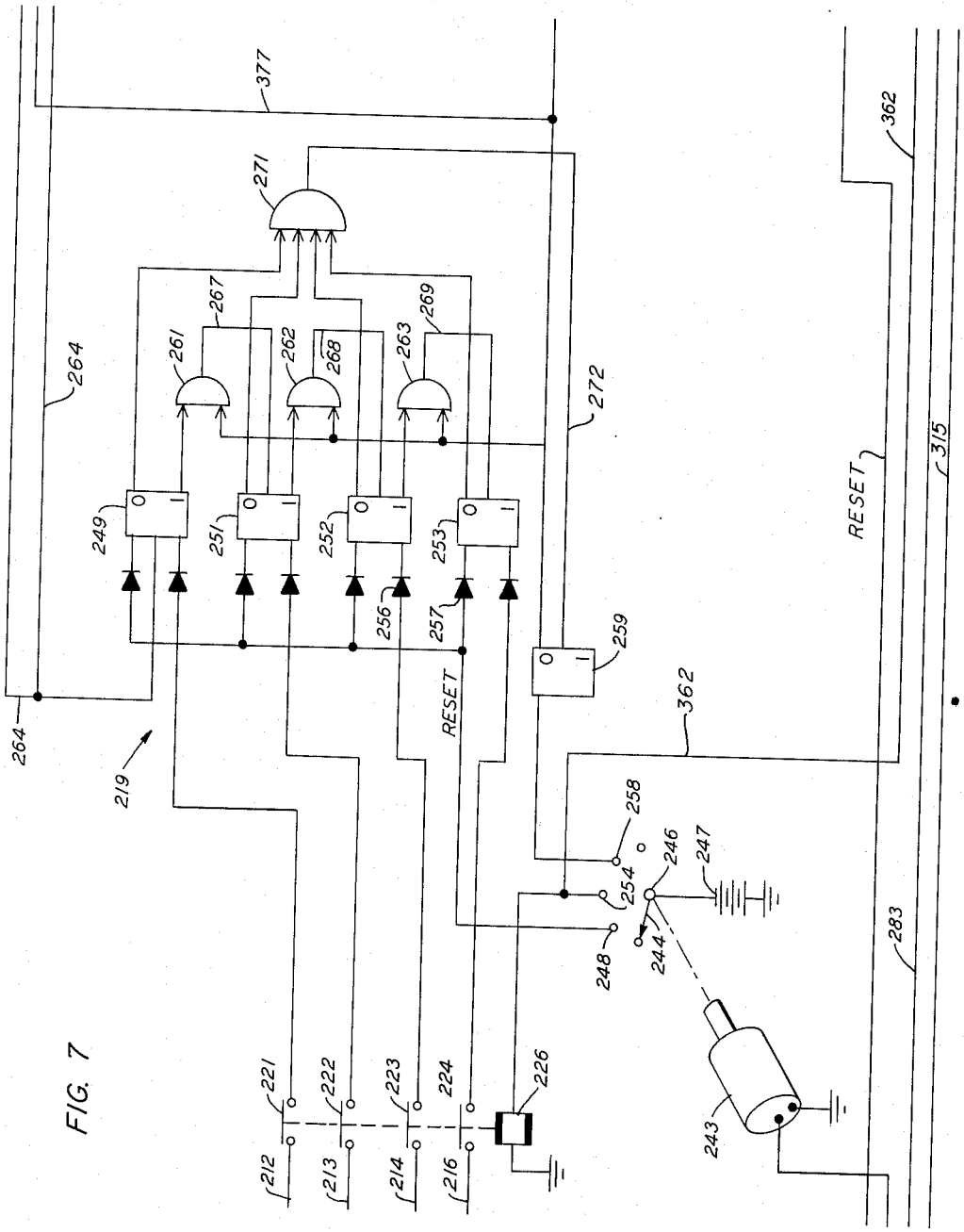

Motor 29 rotates and closes switches 31 and 32 to place the resistor 24 in the bridge circuit of FIG. 5. Simultaneously motor 29 closes switch 39 to energize sequence motor 243 of the serial adder 41 (FIG. 7). Sequence motor 243 rotates the wiper arm 244 of switch 246 and first connects battery 247 to terminal 248. The signal from battery 247 represents a reset zero signal to the flip-flops 249, 251, 252, and 253 of downcounter 219 to reset the flip-flops to their zero conductive states in preparation for the binary input signal from analog-to-binary converter 27, which represents the resistance magnitude of resistor 24. Continued rotation of arm 244 by motor 243 places battery 247 on terminal 254 to energize solenoid 226 which closes contacts 221, 222, 223, and 224, thus impressing the binary output from the analog-to-binary converter 27 on the flip-flops of counter 219.

Relays A, B, C, and D are now connected to the mark or 1 section of flip-flops 249, 251, 252, and 253, respectively. All of the flip-flops used in this system are of a conventional bistable type having two stable conducting conditions or sections. A signal from an outside source is required to change the conductive state from one section of the flip-flop to the other. The sections of the flip-flops have been given a designation for the purpose of facilitating the description of the system. The zero conductive state or 0 digit for the flip-flops used in these circuits is attained when the flip-flops are conducting from the flip-flop section marked with a 0 on the drawings and the mark conductive state or 1 digit is attained when the flip-flops are conducting from the flip-flop section marked with a 1.

Assuming now that the output from relay A is zero or 0, the output from relay B is zero or 0, the output from relay C is a mark or 1, and the output from relay D is a mark or L the outputs from relays C and D will pass through diodes 256 and 257 to set flip-flops 252 and 253 to conduct from the mark section. The zero signals from relays A and B to flip-flop 249 and 251 will permit these flip-flops to conduct from the zero sections as set by the reset signal from battery 247 so that the outputs from flip-flops 249, 251, 252, and 253 are 0, 0, 1, 1, respectively, which represents the binary number 1100 or 12. The number 12 representing the resistance magnitude of resistor 24 has thus been impressed upon downcounter 219.

The diodes connected to the zero sections of flip-flops 249, 251, 252, and 253 prevent a signal output from the zero section of one flip-flop from feeding back to the zero sections of the other flip-flops. This same type of diode feed-back block is used in connection with cumulative counter 237 (FIG. 8) and with the other counting circuits in the system. Next, motor 243 rotates arm 244 of switch 246 to terminal 258 to place a signal from battery 247 on the zero section of flip-flop 259 to reset it to its zero conductive state. The output from the zero section of flip-flop 259 places a signal on and gates 261, 262, and 263. Down-counter 219 is now in condition so that it can receive and count clock pulses which are introduced to the counter over line 264 to flip-flop 249 from a clock head 266, see FIG. 9. Flip-flops 249, 251, 252, and 253 are of the conventional type of flip-flop which has two stable states, as previously described.

As a particular flip-flop of counter 219 is changed from the 0 to the 1 conductive state, a signal is impressed upon an and gate 261-263, respectively associated with the mark section of the particular flip-flop. This and gate, which has previously received the output signal from the 0 section of the flip-flop 259, passes a signal from its associated flip-flop to a subsequent flip-flop in the counter 219. As an example of the operation, assume that the flip-flops 249, 251, 252, and 253 are in the conductive states, 0, 0, 1, 1, respectively. When a clocking pulse from clock head 266 over line 264 energizes flip-flop 249, flip-flop 249 will change from the 0 conductive state to the 1 conductive state. Since an output from the mark section of flip-flop 249 opens and gate 261, a signal will pass through and gate 261 over line 267 to flip-flop 251. This signal will change flip-flop 251 from the 0 conductive state to the 1 conductive state. Again a signal from the mark section of flip-flop 251 opens and gate 262 to pass a signal over line 268 to flip-flop 252. The signal from and gate 262 triggers flip-flop 252 from the 1 conductive state to the 0 conductive state. Since no signal appears at and gate 263 from the mark section of flip-flop 252, and gate 263 will block passage of any signal over line 269 to flip-flop 253, thus leaving flip-flop 253 in a conductive state as previously set by the input from the analog-to-binary converter 27. Now it can be seen that flip-flops 249, 251, 252, and 253 have mark and zero outputs, representing the binary numbers 1, 1, 0, 1, which is a binary representation of the number 11. Subsequent clock pulses from clock head 266 trigger counter 219 to count from 12 to 0, in a manner illustrated for the count from 12 to 11. When the counter 219 reaches zero, all the flip-flops 249, 251, 252, and 253 are in the zero conductive state 0, 0, 0, 0, and gate 271 will open to pass a signal over line 272 to flip-flop 259, to change flip-flop 259 from the zero conductive state to the one conductive state, thus terminating the signal to and gates 261, 262, and 263 to render these gates a block to signal outputs from the associated flip-flops. Clocking pulses from track head 266 no longer trigger counter 219.

Figure 8:
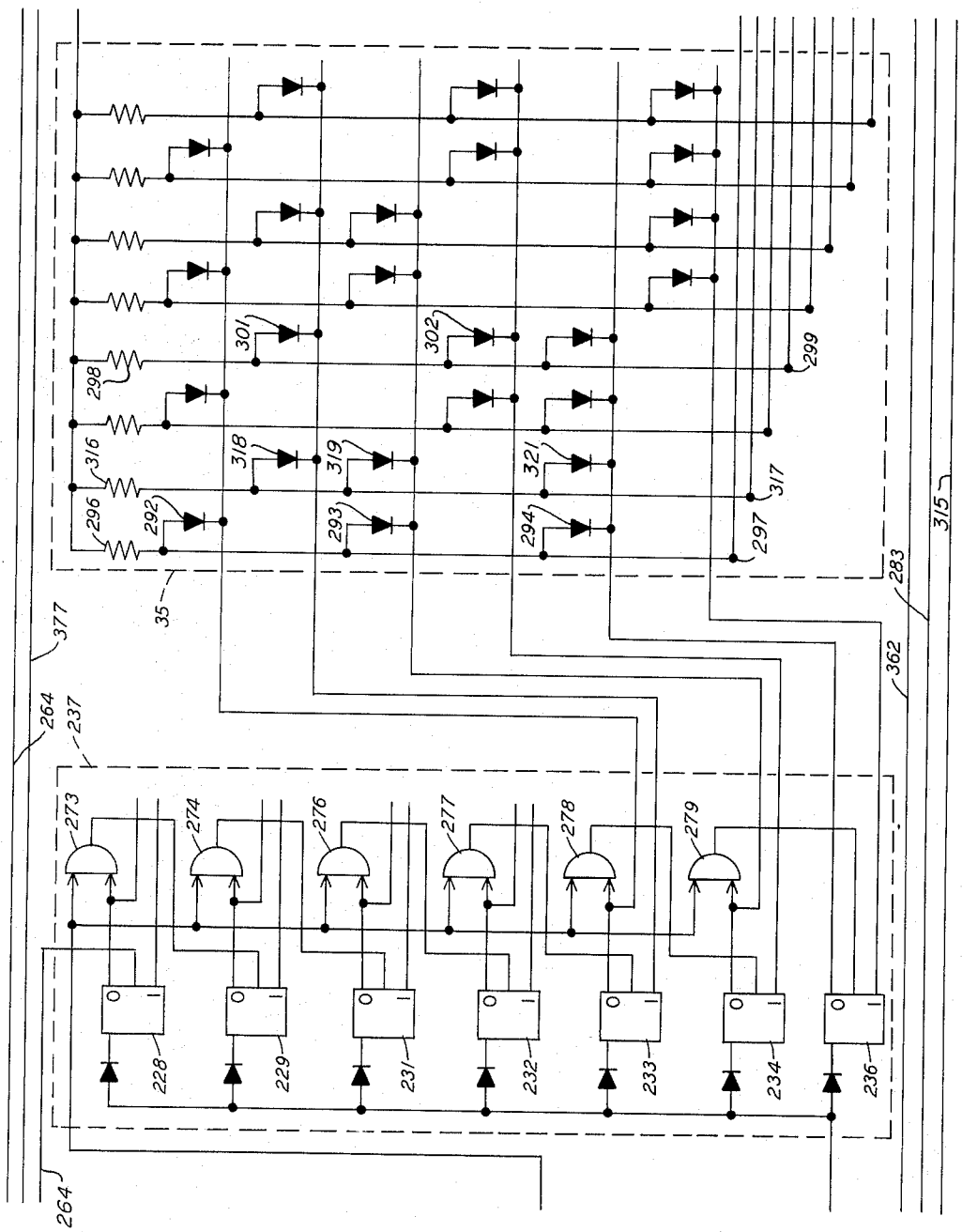

While counter 219 is counting down from the assumed number 12 to 0, cumulative counter 237 is counting from 0 to 12. When flip-flop 259 is switched to the zero conductive state by a signal from battery 247, the output from flip-flop 259 not only opens the and gates of downcounter 219, but it simultaneously places a signal on and gates 273, 274, 276, 277, 278, and 279 associated with flip-flops 228, 229, 231, 232, 233, 234, and 236 of counter 237 (FIG. 8). The clock pulses which trigger downcounter 219 to count from 12 to 0, are simultaneously connected to counter 237 to trigger counter 237 to count from 0 to 12. Cumulative counter 237 operates in exactly the same manner as counter 219 except that it counts in the reverse direction; that is, from 0 to 12, rather than from 12 to 0. It should be noted again that the number 12 is an arbitrarily selected number used only for the purpose of illustrating the functioning of counters 219 and 237 of serial adder 41.

When and gate 271 passes a signal to change the conductive state of flip-flop 259 from a 0 to a 1, and thus terminate the signal to and gates 261, 262, and 263, it also terminates the signal to the and gates associated with the flip-flops of counter 237 to terminate the counting by counter 237. Three notable differences exist between down-counter 219 and counter 237. First, counter 237 contains seven flip-flop circuits with associated and gates, whereas down-counter 219 contains only four of these circuits. Second, the flip-flops of counter 237 count in the exact same manner as those of down-counter 219 except, as noted, the count is in the reverse order. Third, counter 237 does not have a reset circuit which operates each time a resistor 24 is tested, but rather has a reset circuit which passes a reset signal to flip-flops 228, 229, 231, 232, 233, 234, and 236 only after five such resistors 24 are tested and the resistance values are cumulatively counted by counter 237. As previously noted, the reset signal for counter 237 comes from battery 227 upon closure of cam-operated switch 38 after every fifth resistor measurement.

Thus it can be seen that the binary representation of the resistance magnitude of a succession of resistors 24 is counted and registered by counter 237. Motor 243 now rotates back to the start position in preparation for a new cycle of operation. When arm 244 of switch 246 is again rotated to terminal 248, the flip-flops 249, 251, 252, and 253 of down-counter 219 are again reset to the zero conductive state by a signal from battery 247. A second resistor 24 is placed under test on bridge 26 and a second binary number is registered on down-counter 219 from the analog-to-binary converter 27 and again down-counter 219 counts in the reverse direction from this second number to 0. Again, cumulative counter 237 counts the same number of triggering clock pulses from clock head 266 as down-counter 219, but this time cumulative counter 237 begins the count not from 0, but from the previously registered number 12. The result of this subsequent count, is that counter 237 adds the second number to the previously recorded number to register a cumulative sum of the binary numbers which are impressed on down-counter 219. The above-noted cycle is repeated over and over for a given number of cycles, such as five, and counter 237 registers the cumulative sum of the resistance values of the test resistors 24.

The output from serial adder 41 is taken from flip-flops 233, 234, and 236 of counter 237. This output is used to operate matrix 35.

In order to understand the operation of the circuitry following the serial adder 41, which include matrix 35, storage registers, generally designated as 36 (FIG. 9), and analysis circuit 37 (FIG. 10), it is necessary to understand the underlying statistical analysis theory which is used by these circuits for analyzing and utilizing the measured resistance values. First refer to FIG. 14. This figure shows an analysis graph containing zones A, B, C, D, $A^1$, $B^1$, $C^1$, and $D^1$. Reference line 281 of the analysis graph is the chosen ideal value for a desired resistor value. In reality, the value for line 281 represents the resistance value desired for resistor 24, for example 10 ohms. Zones D through $D^1$ represent plus or minus values of resistance which depart at varying magnitudes from the ideal or desired resistance value represented by line 281. In this system, the plotted points, such as point 282, represent not single values of resistance, but cumulative resistance values from a group of five resistors successively measured at the measuring station 25.

It has been found in an automated production line, that in the production of a continuous sequence of components, there are certain statistical distributions of values which will not normally occur without the distribution representing a trend to future production of faulty components. In the statistical system presently being used, the abnormal or statistical distributions of resistance values of groups of five resistors which are not probable are as follows.

It is improbable that eight successive values of resistance will occur in either zone C or above or zone $C^1$ or below without a definite error trend having been established by the machines producing the resistors 24. Thus, eight successive plotted points in either zone C or above or zone $C^1$ or below, will indicate that a correction must be made in order to bring the resistance value of the manufactured resistor 24 back to the desired value represented by line 281. It should be noted that the cumulative values of resistances plotted in zones C or $C^1$ lie within the tolerances established for a particular resistor 24, but the fact that eight successive values of resistance have occurred or have been plotted in zone C or $C^1$, indicates a trend for which a correction must be made. An undesirable trend is also established if four out of five successive cumulative values are plotted in zones B or $B^1$ or beyond these zones. If such a condition occurs, a correction must be made to again bring the value of the produced resistor back to the desired value, as represented by line 281. If two of three successive values are plotted in zones A or above and $A^1$ or below, likewise an error trend is established and a correction must be made. Zones D and $D^1$, although representing resistance values which may fall within the manufacturing tolerances, represent a distribution zone in which only a single plotting point represents a definite trend for which correction must be made.

The circuitry involving the matrix 35, the storage registers 36, and the analysis circuit 37, is designed to record and analyze the aforementioned distributions of resistance values and to produce an error signal in the event that an error trend is established by these circuits. The error signal then triggers subsequent circuits to make a correction at the helixing machine 21 to bring the resistance value of the fabricated resistors back to a value which more nearly coincides with the value represented by line 281.

Counter 237 of serial added 41 cumulatively adds the resistance values of a group of individually tested resistors 24. This value, which counter 237 records, is used to selectively energize matrix 35. Matrix 35 is utilized to direct a signal from battery 57 (FIG. 5) through line 283 to one of eight storage registers 284, 285, 286, 287, 288, 289, 290, and 291 corresponding to zones D, A, B, C, $C^1$, $B^1$, $A^1$, and $D^1$, respectively. If, for example, the flip-flops 233, 234, and 236 of counter 237, are each in the zero conductive state, then the signal output from the zero section of each of the flip-flops bias diodes 292, 293, and 294 (FIG. 8) in the reverse direction so that the input from line 283 will travel through resistor 296 to output terminal 297, which is the input to storage register 284. It should be noted that with flip-flops 233, 234, and 236 in their zero conductive states, the signal on line 283 is blocked from appearing at any other output from the matrix 35 since every other output line has at least one diode biased to short the signal and prevent its appearance at any output other than output terminal 297. As an example, if the pulse were to be traced through resistor 298, which is connected to output terminal 299, it would be noted that diode 301, and also diode 302, represent shorting paths to flip-flops 233 and 234, respectively, thus preventing the pulse from appearing at output terminal 299.

Figure 9:
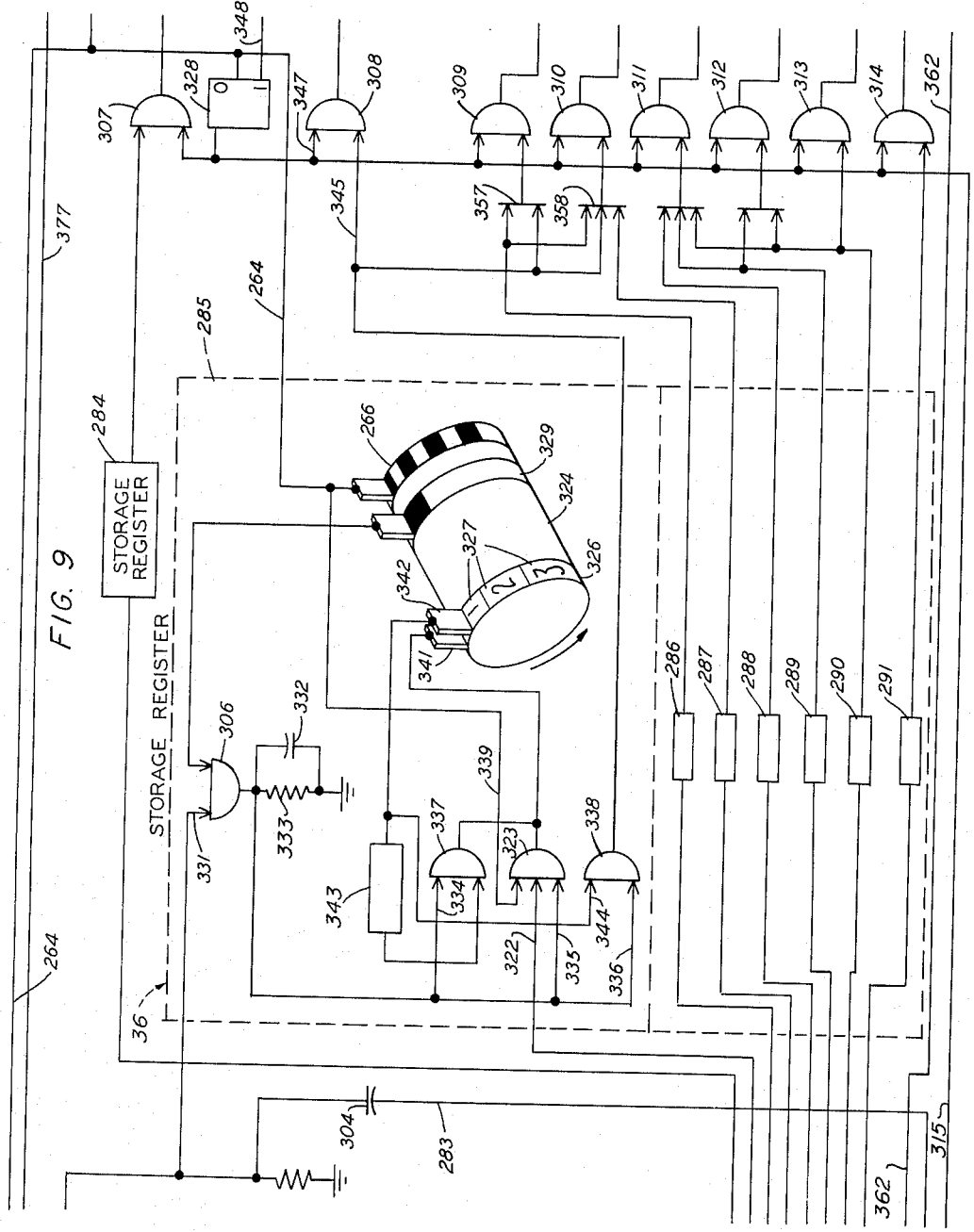
Figure 10:
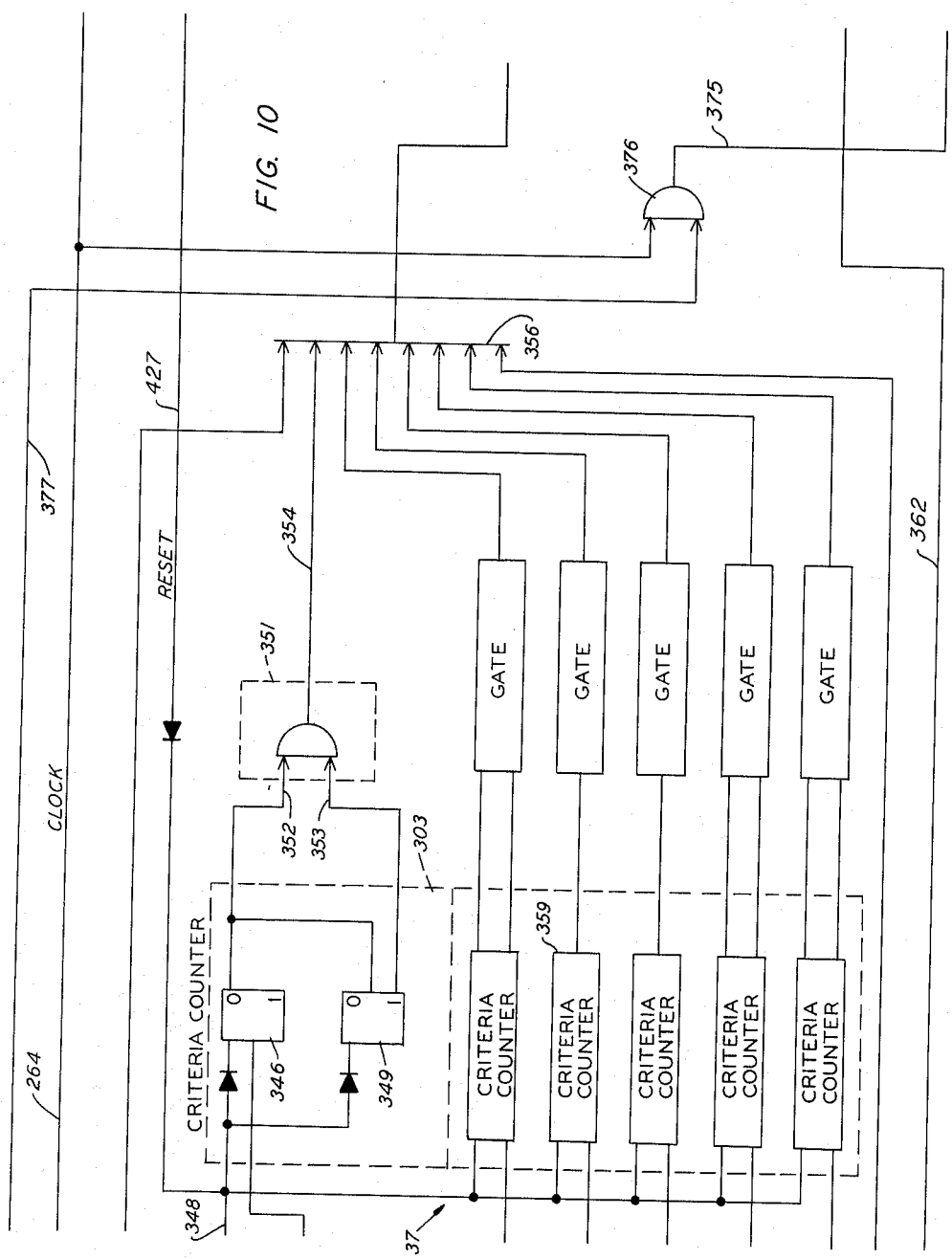

The situation where flip-flops 233, 234, and 236 are in the 1, 0, 0 conductive states, respectively, is the situation which is going to be used from this point on to explain the operation of the matrix, the storage register 285, and the analysis circuits 37, see FIGS. 9 and 10. It should be noted at this point that this is only an example, and that what is said concerning the particular components referred to, is equally true of like components in the associated lines.

While five successive resistors 24 are being measured at the measuring station 25 and the values recorded by serial adder 41, motor 29 rotates cam 42. After the last of a group of five resistors is measured and recorded, cam 42 strikes and closes switches 33 and 34. Closed switches 33 and 34 connect battery 57 through switch 33 to line 283 to charge capacitor 304 (FIG. 9) to place a signal on matrix 35 for transmission to a particular storage register. A signal from battery 57 also conditions and gates 306 for conduction. Simultaneous closure of switch 34 places an enabling bias over lead 315 on and gates 307, 308, 309, 310, 311, 312, 313, and 314 (FIG. 9). When switches 33 and 34 are closed and after the cumulative resistance value is added by counter 237 (FIG. 8), a binary output from flip-flops 233, 234, and 236 is ready to be impressed on matrix 35 to pass the signal from battery 57 through the matrix to an appropriate storage register.

When counter 237 has counted so that flip-flops 233, 234, and 236 are in the 1, 0, 0 conductive states, respectively, the outputs from these flip-flops bias the diodes of matrix 35 so that the only path through matrix 35 for a signal from battery 57 is through resistor 316 (FIG. 9) to output terminal 317. Again it should be noted that diodes 318, 319, and 321 are biased by positive pulses from flip-flops 233, 234, and 236, respectively, so that no shorting path is present and the positive pulse from battery 57 over line 283 must appear at output 317. The output signal from terminal 317 passes to terminal 322 of and gate 323.

Each storage register, as illustrated by register 285, is composed of a recording drum 324 having a recording track 326 divided into sectors for recording electrical impulses fed to recording sectors 327 from the output of matrix 35. The recording track 326 of storage register 285 contains three sectors. The signal which is recorded on register 285 is representative of a cumulative resistance value of a group of five resistors which varies from the desired value to the extent that the value falls in zone A of the graph in FIG. 14. If two successive sectors on recording track 326 are energized, out of the three available, then the two successive recordings will produce two successive outputs to energize criteria counter 303 (FIG. 10). Storage register 285 also contains a clock head 266 designed to send clock pulses over line 264 to flip-flop 328 and to counters 219 and 237. These clock pulses are the pulses which trigger the flip-flops of counters 219 and 237 as previously noted, to make counters 219 and 237 trigger the counters 45 and 46. Storage register 285 also contains a clock synchronization track 329 designed to produce an output to enable and gate 306 so that the introduction of pulses to sector 1 can be started at the precise time that drum 324 begins to rotate.

Storage register 285 operates in the following manner. An output from counter 237 as represented by the conductive states of flip-flops 233, 234, and 236, which open a particular output terminal of matrix 35, in this case output terminal 317, effectively selects the storage register which records the particular output, depending on which distribution zone of the graph in FIG. 14 in which the particular value falls with respect to the desired resistance value. In this case terminal 317 is opened and matrix 35 selects register 285 as the register which represents the proper zone, in this case zone A. After the fifth resistor of a group of five has been tested and motor 29 has rotated cam 42 to close switches 33 and 34, a voltage from battery 57 is impressed upon terminal 331 of and gate 306. A synchronizing pulse from synchronizing track 329 opens and gate 306 long enough to charge capacitor 322, which forms a timing circuit with resistor 333. The discharge time of this resistor-capacitor combination is designed so that capacitor 332 discharges for a period which represents the exact length of time necessary for drum 324 to make one complete revolution. Discharging capacitor 332 places an enabling voltage on terminals 334, 335, and 336 of the and gates 337, 323, and 338, respectively. Thus capacitor 332 enables these and gates for the period of time during which drum 324 is making a complete revolution. A clock pulse from clock head 266 places a voltage on terminal 339 of and gate 323 to periodically open and gate 323 during the rotation of drum 324. The periodic opening of gate 323 corresponds with the presence of a sector 1, 2, or 3 oriented with respect to record head 341, so that a signal can be properly recorded in a particular sector. After terminals 335 and 339 are enabled by signals from capacitor 332 and clock head 266, and gate 323 is opened by a signal to terminal 322 from output point 317 of matrix 35. This signal from matrix 35 represents a new signal, which in turn represents a new point which falls in zone A. This new signal passes through and gate 323 to recording head 341 where the signal energizes a sector of the recording track on recording drum 324.

Assume that the signal from matrix 35 has passed and gate 323, and that a previous signal is recorded in sector 1 of recording track, drum 324 rotates in the counterclockwise direction as indicated by the arrow in FIG. 9. The signal which was formerly retained in sector 1 is delayed by delay circuit 343 and is fed back to and gate 337. And gate 337 passes the delayed signal to record head 341, the same as a new signal passes from matrix 35 through and gate 323 to the record head 341. The delayed signal from sector 1 is again recorded but this time it is recorded in sector 2 of record track 326. Thus, it can be seen that each bit of information which has previously been registered on a record track 326 is advanced one sector; that is, from sector 1 to sector 2, each time drum 324 rotates. If a bit of information appears in sector 3, which is the last sector on the track 326, this bit of information will not be recorded but will be lost because after read head 342 passes over sector 3, capacitor 332 is completely discharged and closes and gate 337 to passage of any delayed signal from the delay line 343 to record head 341. However, loss of bits of information in sector 3 is desired since the register 285 is set up so that at any given time it records the number of cumulative resistance value signals falling in distribution zone A out of a possible three such successive values.

Each time drum 324 rotates, read head 342 scans sectors 1, 2, and 3 in order and receives a signal from each sector which has a bit of stored information. This signal is not only rerecorded, except for a signal from sector 3, but it is also impressed on terminal 344 of and gate 338 for passage to and gate 308. Discharging capacitor 332 energizes terminal 336 of and gate 338 at the same time that it energizes terminal 334 of and gate 337. Consequently, each stored signal from record track, including a signal from sector 3, opens and gate 338 so that a signal is passed to terminal 345 of and gate 308. As with gate 337, and gate 338 is rendered a block to a signal when capacitor 332 is discharged; however, a signal from sector 3 will pass and gate 338 whereas it will not pass and gate 337 because there is a delay circuit 343 in the signal path to and gate 337 to delay the signal long enough to permit capacitor 332 to discharge before the bit of information from sector 3 reaches and gate 337.

In the event that no cumulative resistance value is counted by counter 237 which is recordable on record track 326, drum 324 is rotated as in the case when a new signal is presented to the record track. In this case each sector 1 or 2 which contains a recorded signal produces an output on read head 342 and the signal is delayed by delay line 343 as before. This delayed signal is rerecorded in a subsequent sector 2 or 3, whichever the case may be, as previously described. A signal from sector 3 is lost as previously described. This series of operations proceeds in the absence of a new signal from matrix 35 because register 285 is used to provide a means for establishing the presence of two cumulative resistance values out of a possible series of three which may occur at any given time to establish the presence of an error trend for which a correction must be made on control bridge 22.

The output from storage register 285 by way of terminal 345 of and gate 338 opens gate 308 for passage of the signal to change the conductive state of flip-flop 346 in criteria counter 303 (FIG. 10). Prior to the application of an output signal from storage register 285 to and gate 308, the closed switch 34 places a potential from battery 57 on terminal 347 of and gate 308 in preparation for receipt of the signal from the storage register 285. Battery 57 also energizes flip-flop 328 so that the zero section of the flip-flop is conducting. The output from the mark section of flip-flop 328 over line 348 is terminated and flip-flop 328 thereby loses control of flip-flops 346 and 349. A signal from register 285 through and gate 308 to flip-flop 346 changes flip-flop 346 from the zero conductive state to the mark conductive state.

An output from the mark section of flip-flop 346 in response to a first signal from register 285 is effectively a count of one cumulative resistance value falling in zone A of the graph in FIG. 14 out of the two such cumulative resistance values of a possibility of three, required to establish an undesirable trend. This first output from criteria counter 303 does not open gate 351 since no signal appears on either of the input terminals 352 or 353 of and gate 351. A second signal from register 285 through and gate 308 changes flip-flop 346 from the mark to the zero conductive state so that an output from the zero section appears on terminal 352 of and gate 351. The output from the zero section of the flip-flop 346 is also fed to flip-flop 349 to change flip-flop 349 from the zero conductive state to the mark conductive state. The pulse from the mark section of flip-flop 349 energizes terminal 353 of and gate 351 and together with the signal from flip-flop 346 opens and gate 351 to pass an error signal by way of line 354 to or gate 356. The error signal which passes through and gate 351 occurs as a result of two signals from register 285. These two signals out of a possible three represent two cumulative resistance values of resistors out of a possible three such groupings which will probably not occur without the establishment of an error trend in the production of the resistor. The error signal not only indicates an error trend, but it is used as a basis for making a correction at the helixing station to overcome the error trend. In particular the standard or known resistance value in arm 146 of control bridge 22 (FIG. 12) is changed in accordance with the error signal received from the or gate 356.

Referring again to the analysis circuit 37, it should be particularly noted that the line described in detail, including register 285 and criteria counter 303, does not have an or gate directly between the register and the and gate as do storage registers 286, 287, 288, and 289. As previously noted, the storage register 285, with associated criteria counter 303 and output gate 351, represents the part of the overall circuit which analyzes error trend points which occur in two out of three successive average groupings of test resistors, and which fall in zone A of the graph in FIG. 14. An error point which falls in zone A, and which is analyzed and registered by the described circuits, also is an error point which must be considered as an error point for zones B and C. Or gates 357 and 358 (FIG. 9) are provided so that a signal from storage register 285 not only opens and gate 308 for a zone A error indication point, but a signal from storage register 285 also is fed to and gates 309 and 310 by way of or gates 357 and 358, respectively, so that a zone A error point can be analyzed and considered by the circuits which register and analyze average resistance values which fall within the value deviation of zones B and C. In an operational machine, the separate record tracks for the various storage registers are all placed on a single memory drum. To prevent a signal from a first track from arriving at an or gate, such as gate 357, at the same time that a signal arrives from a second record track, thus appearing as a single output, the individual sectors of one record track are slightly offset from the sectors of the second record track.

As an example of a group of average values of resistance which may be plotted in zones A, B, C, and D, as indicated in FIG. 14, consider the case where six points fall in zone C, one point falls in zone B, and the eighth point falls in zone A. An error signal will not occur because of the error point plotted in zone A, since two points must be plotted in zone A out of a group of three successive measurements in order for a fail output to occur for such a condition. An error signal will not occur because of a distribution point plotted in zone B, since four distribution points out of five successive measurements must occur in zone B in order to establish an error trend. The one point which was plotted in zone A, however, is considered as a point for zone B for the purpose of making up the four distribution points necessary for an error signal. Or gate 357 provides the necessary circuitry for making a distribution point in zone A a consideration for the purpose of a fail output from zone B.

Next consider zone C, which is represented by storage register 287, or gate 358, and gate 310, and criteria counter 359. An error signal will occur from this series of circuits if eight successive measurements occur in zone C. For the purpose of considering the number of distribution points which are counted by criteria counter 359, the points which were plotted in zone A, zone B, and zone C, are considered as having occurred in zone C. Thus it can be seen that the six points plotted in zone C, together with the two distribution points in zone A and zone B, make up the required eight distribution points which create an error signal output through or gate 356, and which indicates that a correction must be made at the helixing machine.

The description of the circuitry which is associated with zones A, B, C, and D applies equally to circuitry associated with zones $A^1$, $B^1$, $C^1$, and $D^1$ of FIG. 14.

After a complete rotation of register drum 324, a new resistor 24 appears at the measuring station and motor 29 rotates cam 42 to count out the next series of five resistors 24 to be measured. Switch 34 opens and the potential from battery 57 holding flip-flop 328 (FIG. 9) in the zero conductive state is removed. The last of the clock pulses resets flip-flop 328 to the mark section. The output from the mark section of flip-flop 328 resets flip-flops 346 and 349 to conduct from the zero sections in preparation for counting subsequent successively registered groups represented by signals stored in sectors 1, 2, and 3 of storage register 285. Flip-flop 328 is also reset to the mark section by a reset signal from control circuit 43 so that in any event, flip-flop 328 is reset to the mark section to reset flip-flops 246 and 349.

The circuitry necessary to utilize the error signal to make a correction on helixing control bridge 22 involves a number of counters and subtractors. These counters and subtractors (see FIGS. 11 and 13) are necessary since a cumulative count of the resistance values and the number of resistors 24 which are measured must be taken in order to control a correction counter 46 which places a correction on control bridge 22.

A complete understanding of the circuitry for utilizing the error signal and for correcting the resistance setup in arm 146 (FIG. 12) on bridge 22 requires a hypothetical set of numbers. Previously the analysis circuit 37 was explained by using a number 12 as an arbitrarily chosen resistance value for resistor 24. Due to the inconvenience of using that particular value to explain the control circuitry of FIGS. 11 and 13, a new set of numbers will be assumed. It should be noted that this new set of criteria is only being used for illustrative purposes. In practice the criteria used throughout the system is the same and is not of different values as are the values being used to explain the operation of the circuit.

Assume the following set of conditions:

| | |
|---|---:|
| Desired resistance value for a group of five resistors | 1000 |
| Offset originally established to get desired value _____ohms__ | 20 |
| Present bridge setup or arm 146 of bridge 22 | 980 |
| Actual value of 5 resistors on counter 45 average being produced | 999 |

The above set of values illustrate the conditions under which the circuitry is operating before any new measurements or error signals occur. Following are the mathematical operations required to produce the necessary control action for changing the set up on control bridge 22.

| | |
|---|---:|
| Step 1: Desired value setting | 1000 |
| Step 2: Add constant | 100 |
| Step 3: Subtract present value | 999 |
| Step 4: Add present bridge setup | 980 |
| Step 5: Subtract constant | 100 |
| Step 6: New bridge setup | 981 |

The above steps are performed by the counters, subtractors, and control circuit, which respond to an error signal to correct the standard resistance value in the arm 146 of bridge 22.

Figure 11:
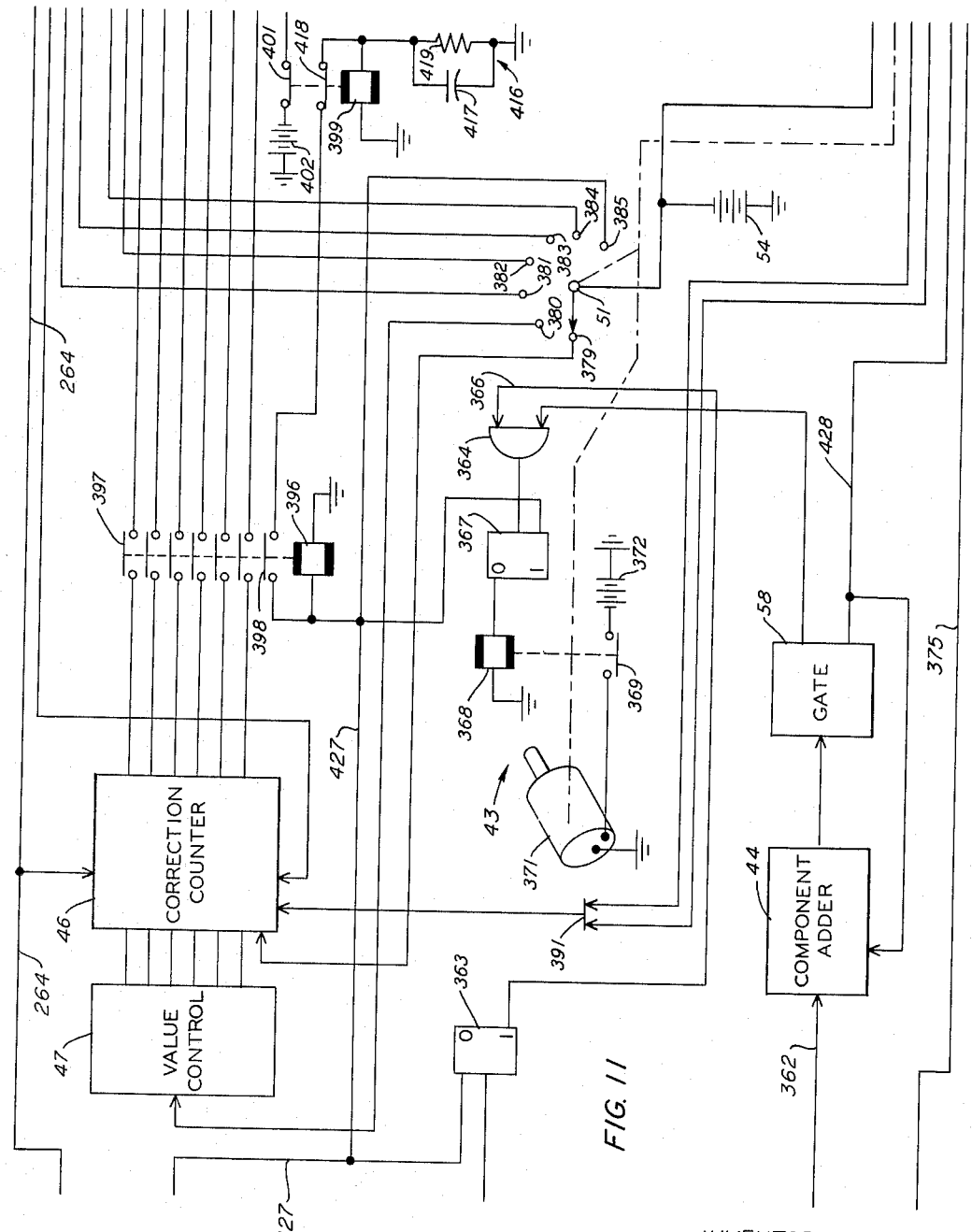
Figure 13:
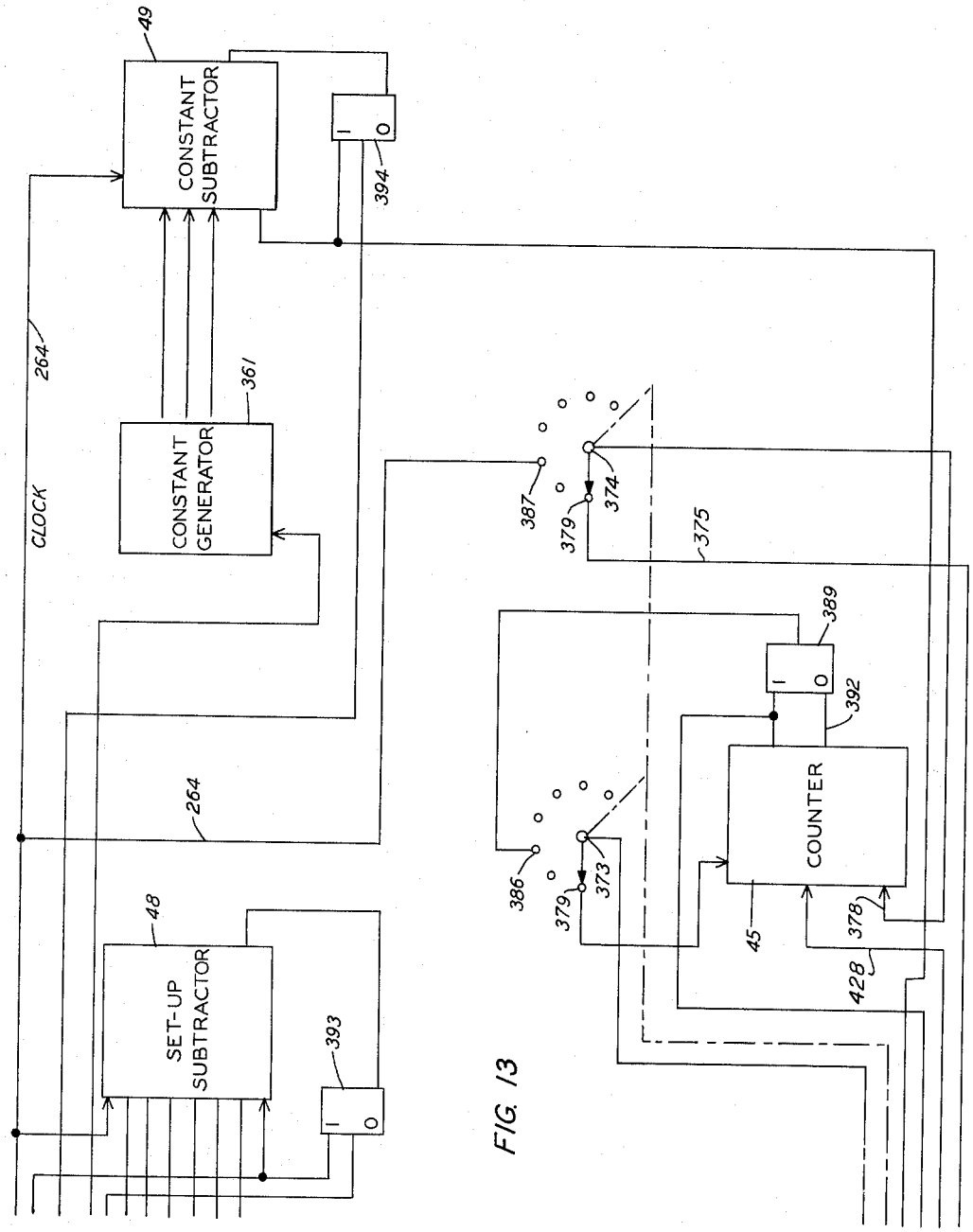

Step one, set forth above, is performed by manually placing a desired value setting of 1000 on value control circuit 47 (FIGS. 4 and 11). In step 2, a constant arbitrary number such as 100, is also added to the value control circuit 47 to produce a value of 1100. This constant value is needed to insure that the value remaining on correction counter 46 (FIGS. 4 and 11) at the end of the calculations of the new set for bridge 22 is not a negative value. The value plus the constant from value control circuit 47 is impressed on correction counter 46. Next, step 3, the cumulative resistance value being counted, that is, the value of a group of five resistors equaling the number 999, which is recorded on counter 45, is subtracted from the value 1100 which has been impressed on correction counter 46, thus leaving a value of 101 impressed on counter 46. Next, in step 4, the present bridge setup of 980 is added to the remainder 101 on correction counter 46 under the control of set-up subtractor 48. Next, in step 5, the constant which was added to step 2 is subtracted from the value presently impressed on correction counter 46. This subtraction operation is performed by constant subtractor 49, which has had the constant of 100 placed on it from constant generator 361 (FIG. 13). Subtraction of the constant from the value impressed on correction counter 46 results in a value of 981 remaining impressed on correction counter 46. This value 981 is the new setting which must be impressed on helixing control bridge 22 in order to make a correction in the value of resistors 24 which are being produced at the helixing station.

Figure 12:
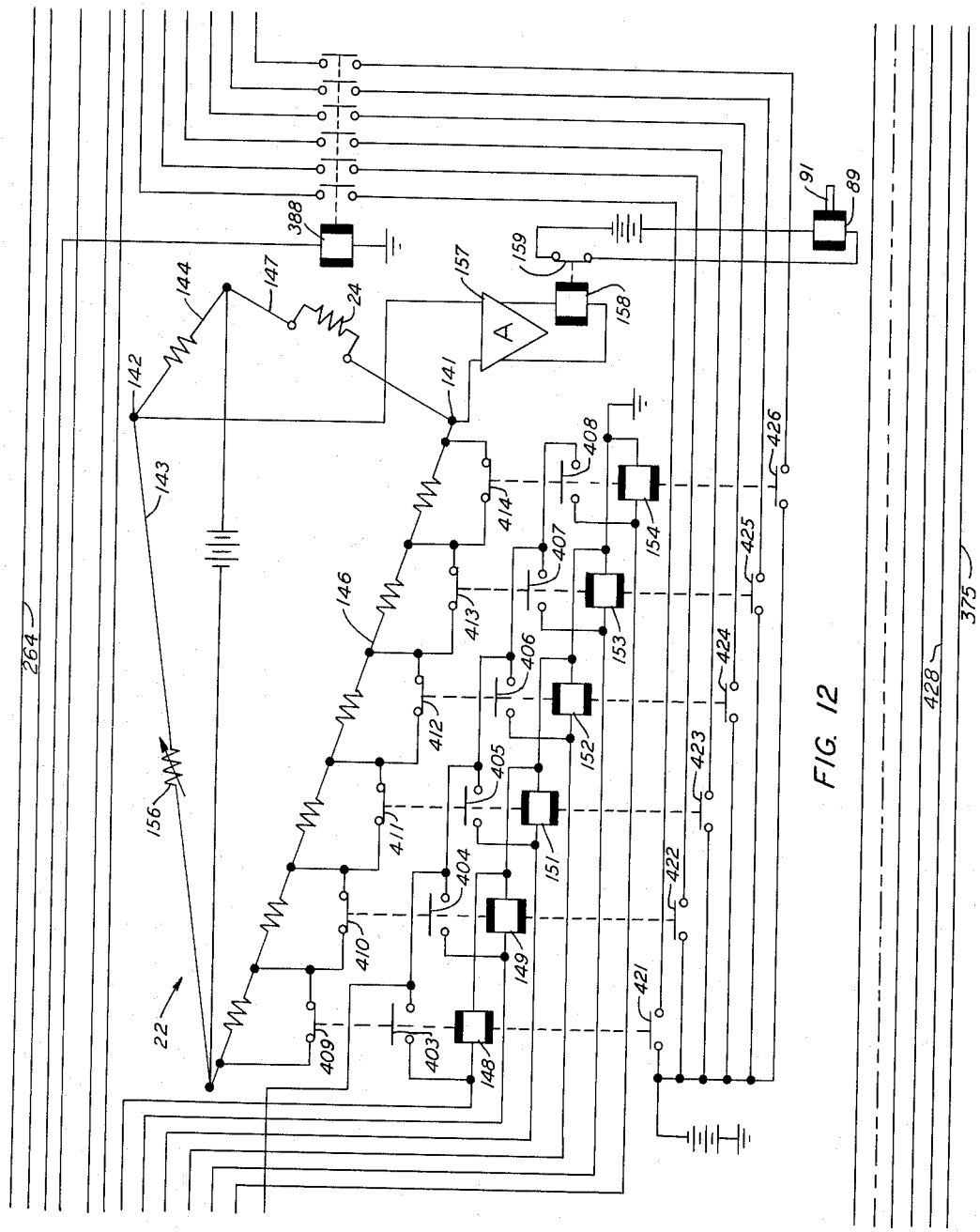

Refer now to FIGS. 11, 12 and 13 for a detailed description of the operation of the counter circuits, subtractor circuits, control circuit 43, and the operation of control bridge 22. Component adder 44 is a conventional adder circuit designed to register a single count each time it is triggered. Component adder 44 is connected to terminal 254 of switch 246 (FIG. 7). Each time motor 243 rotates switch 246 through a complete cycle, battery 247 is connected to terminal 254 and sends a signal over line 362 to component adder 44. Since motor 243 rotates switch arm 244 of switch 246, each time a resistor 24 is measured at measuring station 25, component adder 44 is triggered once for each resistor measurement to produce a cumulative count of the number of resistors tested. The purpose for using adder component 44 is to establish a reference number of resistors which must be tested before a correction is made on bridge 22. Since it is desired to correct bridge 22 only when an error trend is produced, it would be undesirable to correct bridge 22 each time a single error is established. Therefore, component adder 44 is used to establish the number of resistors which must be tested before an error trend, which is evidenced by an error signal, is used to correct control bridge 22.

For illustrative purposes, it will be assumed that the number of resistors which must be tested before a correction is made on control bridge 22 is 10 tested resistors. Thus, each time a resistor 24 is tested, motor 243 rotates switch arm 244 of switch 246 through a complete cycle and a signal from battery 247 triggers adder 44 to count an additional resistor. When the number 10 is counted by component adder 44, an output will occur from the component adder 44 to gate 58 (FIG. 11). Assume also that an error signal is present from or gate 356 (FIG. 10). The error signal sets memory device, flip-flop 363 (FIG. 11), to conduct from the mark section to impress a signal on terminal 366 of and gate 364. Flip-flop 363 is necessary to hold terminal 366 energized for a prolonged period of time in case the error signal from analysis circuit 37 occurs before component adder 44 has counted 10 resistors to place a signal on and gate 364. The output from component adder 44 is channeled through gate 58 and the output from gate 58 is also impressed on and gate 364 to open and gate 364 to pass the error signal to control circuit 43 (see FIG. 11). The output from and gate 364 controls flip-flop 367 and energizes the flip-flop to conduct from the mark section to energize relay 368. Relay 368 closes contact 369 to connect motor 371 to battery 372. Motor 371 rotates the sweep arms of switches 51, 373, and 374.

Next, consider counter 45 (FIG. 13). Counter 45 is a conventional counter which can be triggered to add to or subtract from the value impressed on the counter. Counter 45 is similar to the combination of counters 219 (FIG. 7) and 237 (FIG. 8) and it performs a similar dual operation of adding or subtracting. Counter 45 is connected over lead 375, through gate 376, over lead 377 to serial adder 41 (FIGS. 7 and 8) and also by way of switch 374 (FIG. 13) to a source of clock pulses over line 264. When drum 324 of storage register 285 is rotating, a series of clock pulses is impressed on line 264 and appear at and gate 376 (FIG. 10). At the same time that the clock pulses appear at and gate 376, a signal appears from flip-flop 259 (FIG. 7) of serial adder 41 over line 377 to and gate 376 to open gate 376. Since line 377 is connected to counter 237 of serial adder 41, the resistance values which are counted on counter 237, are also cumulatively added on counter 45. The clock pulses are presented to counter 45 from counter 237 over lead 264 through switch 374 to the input 378. The cumulative resistance value which is counted on counter 45, set forth by the assumed criteria, is the value 999.

While the sweep arm of switch 51 (FIG. 11) is at terminal 379, a potential from battery 54 is impressed on counter 46 to set all the flip-flops of counter 46 to the zero output section of the flip-flops. When the sweep arm of switch 51 is rotated to terminal 380 by energized motor 371, a potential from battery 54 is applied to value control circuit 47, so that terminals which are selectively closed pass a signal from circuit 47 to impress the value on the flip-flops of counter 46. The value impressed on value control circuit 47 is the desired value setting of 1000 plus the constant of 100 which are set forth in steps 1 and 2 of the assumed criteria. Counter circuit 46 is a convention counter which performs the dual function of adding or subtracting depending on how the counter is energized, and operates similar to counter 45. Counter 46 can add to a value or number impressed on the counter or it can subtract from a value impressed on the flip-flops of the counter. The value of 1000 plus the constant 100 is impressed on conventional flip-flops of counter circuit 46.

Next, motor 371 (FIG. 11) rotates the sweep arms of switches 51, 373, and 374 to terminals 381, 386, and 387, respectively (FIGS. 11 and 13). The battery potential of battery 54 energizes relay 388 (FIG. 12), which in turn closes the contacts connecting control bridge 22 with subtractor 48 (FIG. 13). Bridge 22 has a previously set value of 980, as previously set forth in the assumed criteria. This value of 980 is impressed on the flip-flops of subtractor 48. Subtractor 48 contains a single counter which is a down-counter, that is, it counts down from a given value of 980 to 0, such as down-counter 219 (FIG. 7) of serial adder 41. The sweep arm of switch 373 (FIG. 13) connects battery 54 (FIG. 11) to flip-flops 389 to flip the flip-flop 389 from the zero section to the mark section. An output from the mark section of flip-flop 389 energizes the counter 45 so that it counts down from the value of 999 to 0. The down count is triggered since clock pulses are impressed on the input to counter 45 through terminal 387 of switch 374. The clock controlled counting in counter 45 occurs in exactly the same manner as the clock controlled counting which occurred in connection with down-counter 219 (FIG. 7) of serial adder 41.

An output from the mark section of flip-flop 389 (FIG. 13) is also impressed on or gate 391 (FIG. 11) to energize correction counter 46. Again note that the down count of correction counter 46 is controlled by the same clock pulses which are triggering the down count in counter 45. Thus, as the down counter of counter circuit 45 is counting from 999 to 0, the same down count or subtracting operation is performed on correction counter 46. When counter 45 reaches zero, an output occurs over line 392 to reset flip-flop 389 to the zero section, thus, terminating the counting operation on counter 45 and also, and most important, terminating the down count or subtracting operation of correction counter 46. Since the value which was placed on correction counter 46 was 1100, the down count from 999 does not result in counter 46 counting to a value of zero. A value of 101 representing the difference between 1100 and the value 999 is left after the down count on correction counter 46. This corresponds to step 3 of the series of operational steps set forth above.

Next, motor 371 (FIG. 11) rotates the sweep arm of switch 51 to terminal 382 to place a signal from battery 54 on flip-flop 393 (FIG. 13) to energize the flip-flop to conduct from the mark section. An output from the mark section of flip-flop 393 impresses a signal on the set-up subtractor 48 to trigger down count on set-up subtractor 48. Set-up subtractor 49 counts down from the value 980, which was impressed from bridge 22, to zero. The down count on set-up subtractor 48 is controlled by clock pulses which control all the counters and subtractors in the system. Additionally, an output from mark section of flip-flop 393 energizes correction counter 46 so that counter 46 starts an addition or up count from the previously retained value of 101. As the down counter of set-up subtractor 48 proceeds down from the value 980 to 0, the up count on correction counter 46 adds or counts up from the value of 101 to the value of 1081. When set-up subtractor 48 reaches zero, an output occurs to change flip-flop 393 from the mark section to the 0 section to terminate the signal from flip-flop 393 to correction counter 46 and set-up subtractor 48. This action results in completion of an addition step which is step 4 of the above-noted series of operations.

The only undesirable value remaining in the value 1081 is the constant which was added in step 2 of the series of operations. Motor 371 (FIG. 11) next rotates the sweep arm of switch 51 to terminal 383 to impress a signal from battery 54 on flip-flop 394 (FIG. 13) to energize flip-flop 394 to conduct from the mark section. An output from the mark section of flip-flop 394 initiates a down count on constant subtractor 49, so that subtractor 49 counts down from the arbitrarily chosen constant 100 to 0. An output from the mark section of flip-flop 394 also impresses a signal on counter 46 so that as constant subtractor 49 is counting down from 100 to 0, the counter 46 is also counted down the same number of digits. Again note that both of these counters are counting down under the control of the same clock pulses from clock head 266. This down count on subtractor 49 and counter 46 results in a subtraction step, subtracting the constant value of 100 from the value of 1081 which remained impressed on correction counter 46 after the present bridge setup was added on counter 46. The result of the subtraction of the constant is a value of 981. This value 981, which remains on correction counter 46, is the new setup which must be impressed on helixing control bridge 22 in order that a change can be made in the length of the helical groove which is being cut in the carbon deposit of resistor 24 at the helixing station by actuation of solenoid 89 (FIG. 12).

Motor 371 (FIG. 11) rotates the sweep arm of switch 51 to terminal 384 to connect battery 54 to constant generator 361 (FIG. 13). Constant generator 361 is set to repeatedly impress a standard arbitrarily chosen constant of constant 100 on the flip-flops of subtractor 49. After constant subtractor 49 has counted from 100 to 0, all the flip-flops of the subtractor are set to conduct from the zero section. In order to prepare constant subtractor 49 for a subsequent correction cycle, the constant of 100 must again be impressed on the flip-flops of subtractor 49. This is accomplished by energizing a constant generator 361 which selectively energizes the mark and zero sections of the flip-flops of subtractor 49 so that the output from the selectively energized flip-flops represent the constant 100.

Next, motor 371 (FIG. 11) rotates the sweep arm of switch 51 to terminal 385 to energize relay 396 (FIG. 11). Relay 396 closes the contacts 397 between correction counter 46 and helixing control bridge 22 (FIG. 12) to impress the value 981 contained on the flip-flops of the counter 46 on relays 148, 149, 151, 152, 153, and 154 of control bridge 22. Relay 396 also closes contact 398 to place a potential across relay 399 from battery 54. Relay 399 opens normally closed contact 401 (see FIG. 11) to remove the potential from battery 402 from holding contacts 403, 404, 405, 406, 407, and 408. Holding contacts 403 through 408 are holding contacts which are selectively closed to selectively maintain relays 148, 149, 151, 152, 153, and 154 energized to represent the value of resistances which is to be maintained in arm 146 of bridge 22 by selectively opening contacts 409, 410, 411, 412, 413, and 414. The selectively opened contacts 409 through 414 place associated standard resistors in arm 146 of the bridge to establish the reference for controlling the resistance value of resistor 24. Previously the value 980 was impressed on contacts 403 through 408 and 409 through 414. In order that a new value may be impressed on these contacts, contacts 403 through 408 must be momentarily released.

To release contacts 403 through 408 is the function of relay 399 (FIG. 11) and contact 401. When relay 399 is energized, the R-C timing circuit 416 is energized and capacitor 417 charges to battery potential of battery 54. Relay 399 operates contact 401 only after capacitor 417 is fully charged. Relay 399 also opens contact 418 to disconnect battery 402 from relay 399. When contact 418 is opened, capacitor 417 begins to discharge and after a time determined by the magnitude of resistor 419, capacitor 417 completely discharges through relay 399. De-energized relay 399 releases contact 401. Released contact 401 again closes to reconnect battery 402 to holding contacts 403 through 408 so that the new value 981 may be selectively impressed on relays 148 through 154 from counter circuit 46 and to maintain relays 148 through 154 selectively energized through holding contacts 403 through 408. The potential from the flip-flops of counter 46 selectively energize relays 148 through 154. The selectively energized relays 148 through 154 selectively open corresponding contacts 409 through 414 which form shunting circuits for associated resistors in arm 146 of control bridge 22. Thus, the selective energization of relays 148 through 154 result in selective placement of resistors of varying magnitudes in arm 146 of control bridge 22 to establish the reference resistances for controlling the resistance magnitude of resistor 24 which is placed in arm 147 of bridge 22.

At the same time that selectively energized relays 148 through 154 close holding contacts 403 through 408 and open contacts 409 through 414, the selectively closed relays also close contacts 421 through 426. Contacts 421 through 426 thus have the same value 981 impressed thereon as is impressed on control bridge 22. These contacts, 421 through 426 contain the value which will next be impressed on subtractor 48 when a subsequent change is to be made on control bridge 22. This completes the correction cycle when an error signal occurs from analysis circuit 37. Continued rotation of switch 51 by motor 371 (FIG. 11) brings the sweep arms of switches 51, 373, and 374 back to the start terminals.

Also, when the sweep arm of switch 51 is connected to terminal 385, a signal from battery 54 is not only impressed on relay 396, but additionally a reset signal is impressed on line 427 which is connected to flip-flop 328 (FIG. 9) and flip-flop 363 (FIG. 11). This reset signal changes flip-flop 328 to the mark conducting section so that an output from the mark section of flip-flop 328 resets the flip-flops 346 and 349 of criteria counter 303. A signal from battery 54 through terminal 385 is likewise impressed on the zero section of flip-flop 363 (FIG. 11) to terminate the output from the mark section of flip-flop 363. Termination of the output from flip-flop 363 closes and gate 364 so that flip-flop 367 is released and can be reset to the zero section by a signal from battery 54.

When flip-flop 367 is reset to the zero section, relay 368 is deenergized and opens contact 369 to disconnect motor 371 from its power supply. Motor 371 coasts to a stop, returning the sweep arms of switches 51, 373, and 374 to the start position, terminals 379. Battery 54 is again connected to correction counter 46 to reset the flip-flops to the zero section and is connected to counter 45 through switches 373 (FIG. 13) and 374 to initiate a new cumulative count of resistance values which are simultaneously registered on counter 237 of serial adder 41.

In the event that no error signal occurs from analysis circuit 37 after component adder 44 counts 10 resistors, the output from component adder 44 to gate 58 is impressed on and gate 364, but and gate 364 is not opened since no error signal occurs from analysis circuit 37. When this situation occurs, the next resistor 24 or resistor number 11, which is measured at measuring station 25, produces a signal from component adder 44 to gate 58 and an output will occur on line 428 to reset counter 45 to 0 so that another cumulative count begins on 45. Additionally, the output on line 428 is fed back to component added 44 to reset the flip-flops of adder 44 to zero so that a subsequent 10 resistors can be counted on component adder 44.

It is to be understood that the above-described system and apparatus is merely illustrative of the application of the principles of the invention and many other modifications may be made without departing from the spirit and scope thereof.

What is claimed is:

1. In a system for controlling an adjustable facility in a fabricating machine,
a device for measuring a predetermined parameter of a fabricated article and for generating a signal having a magnitude proportional to said parameter,
means for feeding articles from said machine to said device,
means rendered effective by the feeding of each article to said device for operating said device and for storing an item of data derived from said signal, and
means responsive to the storing of a predetermined number of items of data for indicating a trend of values of said parameter outside of predetermined limits and for actuating said adjustable facility an amount proportional to the magnitude of said signal from which was derived the last item of data stored.

2. In a system for controlling an adjustable facility in a fabricating machine,
means for measuring a predetermined parameter of a fabricated article and for generating a signal having a magnitude proportional to said parameter,
means having an article storage facility for feeding articles from said machine to said measuring means,
means rendered effective by the feeding of each article to said measuring means for operating said measuring means,
means responsive to said measuring means for storing a predetermined number of items of data derived from said signal,
means responsive to the storing of said predetermined number of items of data for indicating a trend of the values of said parameters outside of predetermined limits and for generating an error signal proportional to the magnitude of said signal from which was derived the last item of data stored, and
means responsive to said error signal for actuating said adjustable facility to correct the trend.

3. In a system for controlling an adjustable facility in a fabricating machine,
means for measuring a predetermined physical parameter of a fabricated article and for producing an output signal proportional to said parameter,
means having an article storage facility for feeding articles from said machine to said measuring means,
means rendered effective by the feeding of each article to said measuring means for operating said measuring means,
first means responsive to said measuring means for storing a first predetermined number of items of data derived from said output signals,
means responsive to the storing of said predetermined number of items of data for indicating a trend of the values of said parameters outside of predetermined limits and for generating an error signal,
second means responsive to said first storing means for storing a second predetermined number of items of data derived from said output signals, and
means responsive to said second storing means and responsive to said error signal for adjusting said adjustable facility an amount proportional to the sum of said second predetermined number of items of data to correct the trend.

4. A monitoring system for controlling a component fabricating machine utilizing a bridge having a variable resistor for controlling said machine which system comprises a timer for controlling the sequence of operations of said system, means operated by said timer for measuring an electrical characteristic of said component, means responsive to said measuring means for converting the measured characteristic to a binary signal, means responsive to said binary signal means and operated by said timer for cumulatively adding the value of a predetermined group of said binary signals, means operated by said adding means and said timer for analyzing the cumulatively added group of binary signals and for generating an output signal indicative of a measured electrical characteristic beyond predetermined limits, and means responsive to said output signal for adjusting the said variable resistor.

5. A system utilizing a control bridge with a variable resistor for controlling an electrical component fabricating machine which comprises a timer for controlling the sequence of operation of said system, means for measuring an electrical characteristic of said component, means connected to said measuring means for converting the measured characteristic to a binary signal, means responsive to said converting means and said timer for cumulatively adding the value of a first predetermined group of said binary signals, means connected to said adding means and said timer for analyzing said first group of added binary signals, means connected to said adding means for counting a second predetermined group of binary signals, a counter connected to said adding means for cumulatively adding the binary value of said second predetermined group of binary signals and for generating an output signal indicative of a cumulative value of said second group of binary signals, a control circuit responsive to said analyzing means and said counting means for terminating said counter, and means responsive to said output signal and controlled by said control circuit for adjusting said variable resistor.

6. A system utilizing a control bridge with a variable resistor for adjusting a component fabricating machine, which system comprises:
   means for controlling the sequence of operation of said system,
   means for measuring a characteristic of said component and for generating a signal having a magnitude proportional to said characteristic,
   means responsive to said signal for converting the signal to a digital electrical signal,
   first means responsive to said digital electrical signal and said sequence controlling means for adding the values of a first predetermined group of said digital electrical signals,
   second means responsive to said first means and said sequence controlling means for analyzing said first group of added digital electrical signals,
   third means responsive to said first means for counting the occurrences of each of a second predetermined group of digital electrical signals,
   a counter responsive to said first and said third means for adding the digital values of said second predetermined group of digital electrical signals and for generating an output signal proportional to the sum of said second group of digital electrical signals,
   a control circuit responsive to said second means and said third means for terminating the count of said counter, and
   means responsive to said output signal and controlled by said control circuit for adjusting said variable resistor.

7. In a monitoring and control system for controlling an adjustable component fabricating machine, a timer for generating control signals to coordinate the sequence of operations of said system, means controlled by said timer for measuring an electrical characteristic of said component and for generating an electrical signal representing said characteristic, a converter connected to said timer and responsive to said electrical signal for converting said electrical signal to a binary signal, an adder controlled by said timer for cumulatively adding the value of a predetermined number of binary signals, a storage register controlled by said timer and having storage sectors for recording control signals, means controlled by said timer and said adder for electrically gating a control signal from said timer to a predetermined sector of said storage register when the predetermined number of binary signals are cumulatively added, an analysis circuit responsive to the recording of a predetermined series of control signals on the sectors of said register for detecting an error trend in the magnitude of the characteristic of components fabricated by said fabricating machine and for generating an output signal indicative of said error trend, and means responsive to said output signal for adjusting said fabricating machine.

8. In a monitoring and control system for controlling an adjustable component fabricating machine, a timer for generating control signals to coordinate the sequence of operations of said system, means controlled by said timer for measuring an electrical characteristic of said component and for generating a signal indicative of said characteristic, an adder responsive to said control signals for cumulatively adding the value of a predetermined group of said signals, a storage register responsive to said control signals and having storage sectors for recording said control signals, means responsive to said timer and controlled by said adder for gating a control signal from said timer to a predetermined sector of said storage register when the predetermined number of said signals are cumulatively added, an analysis circuit responsive to the recording of a predetermined series of control signals on the sectors of said register for detecting an error trend in the magnitude of the characteristic of the fabricated components and for generating an output signal indicative of said error trend, and means responsive to said output signal for adjusting said fabricating machine.

9. A monitoring system which comprises an electrical control bridge having a variable resistor, means controlled by a signal from said control bridge for fabricating a component with a predetermined characteristic, a timer for producing control signals to control the sequence of operations of said system, a control station for receiving the fabricated component and for initiating the operation of said timer, an electrical measuring bridge responsive to said timer for measuring the magnitude of a characteristic of said component and for generating a value signal indicative of said characteristic, means responsive to said value signal from said measuring bridge for converting said value signal to a binary signal, an adder responsive to said timer for cumulatively adding a predetermined number of said binary signals, a plurality of storage registers individually responsive to said timer for recording a control signal, means selectively controlled by said adder for gating a control signal from said timer to one of said registers when a predetermined number of binary signals are cumulatively added, means responsive to the recording of a predetermined number of control signals for generating an error signal indicative of a component characteristic which tends to vary beyond predetermined limits from said predetermined characteristic, and means responsive to said error signal for adjusting said variable resistor.

10. A monitoring system for controlling the manufacture of a carbon deposit resistor at a helixing machine which comprises, a control bridge having a variable resistor for controlling said helixing machine, a timer for generating a control signal to control the sequence of operations of said system, a measuring station for measuring the resistance value of said resistors and for initiating the operation of said timer, means for conveying a resistor from said helixing machine to said measuring station, means controlled by said timer and responsive to said measuring station for generating a binary signal indicative of said resistance value, means responsive to said timer for cumulatively adding the binary value of a predetermined number of said binary signals, a plurality of storage registers having signal storage sectors and responsive to said timer for recording control signals on said sectors, a matrix gate selectively controlled by said adding means for passing a control signal from said timer to one of said sectors when a predetermined number of binary signals have been added, an output gate, means responsive to the recording of a predetermined series of control signals for enabling said output gate and for generating an error signal, and means responsive to said error signal for changing the resistance value of said variable resistor.

11. A monitoring system utilizing a variable control bridge for controlling an electrical component fabricating machine which comprises a timer to control the sequence of operations of said system, means for producing an electrical signal indicative of a characteristic of said component and for initiating operation of said timer, means controlled by said timer for converting said electrical signal to a binary signal, means for generating clock pulses, means controlled by said timer and said clock pulses for cumulatively adding the value of a predetermined number of said binary signals, means triggered by said clock pulses and responsive to said timer and said adding means for registering a predetermined number of added binary signals, means operated by said timer and said generating means for generating and passing an error signal in response to a predetermined series of registered binary signals, and means responsive to said error signal and triggered by said clock pulses for varying said control bridge.

12. A system for monitoring and controlling a helixing machine for cutting a resistance path on a resistor which comprises a bridge having a variable resistor for controlling said machine, means for measuring the resistance magnitude of said resistor and for generating an electrical signal indicative thereof, a timer actuated by said measuring means for generating a control signal to control the sequence of operations of said monitoring and controlling system, a convertor controlled by said timer for converting said electrical signal to a binary signal, means for generating clock pulses, a serial adder triggered by said clock pulses for cumulatively adding the binary value of a predetermined group of binary signals, means controlled by said timer for periodically applying said binary signal to said adder, a register triggered by said clock signals for recording a control signal, gate means operated by said adder for passing a control signal from said timer to said register, means rendered effective by said timer and responsive to a predetermined series of recorded control signals for generating an error signal, a counter triggered by said clock pulses and connected to said serial adder for adding the binary value of a predetermined number of binary signals from said converter, an adder triggered by said clock pulses and connected to said applying means for counting said predetermined number of binary signals and for generating a signal indicative of said binary signals, a control circuit responsive simultaneously to a signal from said adder and said error signal for terminating said counter, and means connected to said control circuit and triggered by said clock pulses for adjusting said variable resistor in accordance with a signal from said counter.

13. A monitoring system for controlling an electrical component fabricating machine which comprises means for measuring a characteristic of said component and for generating an electrical signal indicative of the characteristic, means for converting said electrical signal to a binary signal, means for generating clock pulses, means for cumulatively adding the value of a predetermined number of said binary signals in response to said clock pulses, a source for generating indicator signals, a plurality of storage registers triggered by said clock pulses for selectively recording said indicator signals, a matrix gate selectively controlled by said adding means for gating said indicating signal from said source to one of said storage registers, a plurality of analysis circuits responsive to a predetermined series of recorded indicator signals for generating an error signal, and means responsive to said error signal and triggered by said clock pulses for adjusting said fabricating machine.

14. A monitoring system including a control bridge having a variable resistor for controlling a component fabricating machine in accordance with measured characteristics of the component which comprises means for cumulatively recording the characteristic magnitude of a first predetermined grouping of said components, means connected to said recording means for detecting a predetermined number of recorded groupings which exceed a predetermined magnitude, means connected to said recording means for cumulatively counting the characteristic magnitude of a second predetermined grouping of said components, means connected to said recording means for adding the number of components measured in said second grouping, means impressed with a preselected signal for varying said variable resistor, a control circuit controlled by said adding means and said detecting means for interconnecting said counting means and said varying means, said preselected signal being diminished in accordance with the cumulative count on said counting means, means selectively connected to said varying means by said control circuit for impressing the value of said variable resistance value on said varying means to alter said preselected signal, switching means interconnecting said varying means and said control bridge and actuated by said control circuit for applying the altered signal to vary said variable resistor.

15. A monitoring system for controlling a component fabricating machine which comprises a control bridge having a variable resistor, means for individually measuring the magnitude of an electrical characteristic of a component, a convertor for changing the magnitude of said measured characteristic to a binary signal, a first means connected to said convertor for cumulatively adding the binary value of a first predetermined grouping of binary signals and for generating an indicating signal indicative of the added binary value, means for registering said indicating signal, means connected to said first adding means for counting a second grouping of measured components, a second means connected to said first adding means for cumulatively adding the binary value of said second grouping of binary signals, means controlled by said counting means and by said registered indicating signal for terminating said second adding means, and means controlled by said second adding means and controlled by said terminating means for varying the resistance magnitude of said variable resistor in accordance with the binary sum of said second cumulatively added grouping of binary signals.

16. A monitoring and measuring system for controlling a resistor fabricating machine which comprises a bridge having a variable resistor for controlling the fabricating machine, a timer to control the sequence of operation of said system, means for measuring the resistance value of a resistor, means connected to said measuring means for converting the resistance value to a binary signal, means controlled by said converting means and said timer for adding the binary values of a predetermined group of said binary signals, means connected to said adding means and said timer for analyzing the added binary signals, means connected to said adding means for counting a predetermined number of binary signals, a counter connected to said adding means for cumulatively adding the binary value of said predetermined number of binary signals and for generating a value signal indicative of the added binary signals, means for varying the resistance magnitude of said variable resistor, means connected to said bridge for recording the resistance value of said variable resistor and for generating an output signal indicative of the resistance value, and means controlled by said counting means and said analyzing means for terminating said counter and for applying said value signal and said output signal to said varying means whereby said varying means adjust said variable resistor in accordance with said value and output signals.

17. A monitoring and measuring system for controlling a resistor fabricating machine which comprises a bridge having a variable resistor for controlling said fabricating machine, timer means for generating control signals to control the sequence of operations of said system, means for measuring the resistance value of a resistor and for initiating operation of said timer means, means connected to said measuring means and controlled by said timer means for converting said resistance value to a binary signal, means for generating clock pulses, means rendered effective by said clock pulses for cumulatively adding the binary value of a predetermined group of binary signals and for generating an output signal indicative of said added binary signals, means operated by said timer means for periodically applying said binary signal from said converting means to said adding means, a storage register controlled by said timer means having a predetermined number of sections for successively recording control signals, means for selectively passing a control signal to a section of said register in response to said output signal, means for generating and passing an error signal in response to recording of a predetermined series of control signals, an adder connected to said applying means and triggered by said clock pulses for counting a predetermined number of binary signals passed to said adding means, a counter connected to said adding means and triggered by said clock pulses for cumulatively adding the binary value of said predetermined number of binary signals and for generating a signal indicative of the added binary signals, means for varying the resistance magnitude of said variable resistor, means connected to said bridge and triggered by said clock pulses for recording a binary representation of the resistance value of said variable resistor and for generating a signal indicative of said resistance value, and a control circuit responsive simultaneously to a signal from said counter and said error signal for terminating said counter and for applying a signal from said counter and said recording means to said varying means whereby said varying means adjusts said variable resistor in accordance with the magnitude of the signals from said counter and recording means.

References Cited by the Examiner

UNITED STATES PATENTS

| | | | |
|---|---|---|---|
| 1,859,112 | 5/1932 | Silberstein | 29—155.7 XR |
| 2,664,557 | 12/1953 | Sargrove | 82—903 |
| 2,884,746 | 5/1959 | Rus et al. | 51—37 |
| 2,897,638 | 8/1959 | Maker | 51—165 |

FOREIGN PATENTS 801,005   9/1958   Great Britain.

MALCOLM A. MORRISON, *Primary Examiner.*

LEON PEAR, *Examiner.*

UNITED STATES PATENT OFFICE
CERTIFICATE OF CORRECTION

Patent No. 3,222,504                                       December 7, 1965

Howard H. Arnold et al.

It is hereby certified that error appears in the above numbered patent requiring correction and that the said Letters Patent should read as corrected below.

Column 6, line 69, strike out "see FIG. 6"; column 9, line 14, for "27" read -- 227 --; column 14, line 18, after "is" insert -- picked up by read head 342 before the new signal is recorded in sector 1. The signal picked up from sector 1 is --; column 20, line 18, strike out "constant" and insert the same after "of", second occurrence, same line 18, same column 20.

Signed and sealed this 7th day of February 1967.

(SEAL)

Attest:

ERNEST W. SWIDER                                             EDWARD J. BRENNER

Attesting Officer                                                    Commissioner of Patents